(12) United States Patent
O'Shaughnessy

(10) Patent No.: US 7,586,664 B2
(45) Date of Patent: Sep. 8, 2009

(54) TRANSPARENT ELECTRODE FOR AN ELECTROCHROMIC SWITCHABLE CELL

(75) Inventor: Dennis J. O'Shaughnessy, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 425 days.

(21) Appl. No.: 11/472,334

(22) Filed: Jun. 22, 2006

(65) Prior Publication Data

US 2007/0002422 A1 Jan. 4, 2007

(51) Int. Cl.
- *G02F 1/15* (2006.01)
- *G02F 1/03* (2006.01)
- *G02B 27/00* (2006.01)

(52) U.S. Cl. .................. 359/265; 359/245; 359/250; 359/253; 359/254; 359/272; 359/274; 359/601; 359/614; 349/139; 349/147; 349/149; 349/152; 345/103; 345/105; 345/107

(58) Field of Classification Search .................. 345/49, 345/50, 98, 103, 105, 107; 359/296, 245–279, 359/601, 614; 349/139, 147, 149, 152
See application file for complete search history.

(56) References Cited

U.S. PATENT DOCUMENTS

| | | | |
|---|---|---|---|
| 4,773,735 A | 9/1988 | Ukrainsky et al. | |
| 5,202,787 A | 4/1993 | Byker et al. | |
| 5,471,554 A | 11/1995 | Rukavina et al. | |
| 5,805,330 A | 9/1998 | Byker et al. | |
| 5,821,001 A | 10/1998 | Arbab et al. | |
| 5,965,853 A | 10/1999 | Hornsey | |
| 6,064,509 A | 5/2000 | Tonar et al. | |
| 6,398,925 B1 | 6/2002 | Arbab et al. | |
| 6,471,360 B2 | 10/2002 | Rukavina et al. | |

(Continued)

FOREIGN PATENT DOCUMENTS

| | | |
|---|---|---|
| EP | 0 611 213 B1 | 8/1997 |
| EP | 0 678 484 B1 | 6/1999 |
| EP | 0915360 A2 | 12/1999 |
| EP | 0 718 200 B1 | 3/2000 |
| JP | 60262139 A | 12/1985 |

(Continued)

OTHER PUBLICATIONS

Rukavina et al, U.S. Appl. No. 11/472,331, entitled "A Vision Panel Having A Multi Layer Primer," filed Jun. 22, 2006.

(Continued)

*Primary Examiner*—Evelyn A. Lester
(74) *Attorney, Agent, or Firm*—Andrew C. Siminerio

(57) ABSTRACT

An electrochromic switchable transparency, e.g. a window and/or a mirror includes an electrochromic switchable medium between a pair of electrode assemblies. At least one of the electrode assemblies is transparent to visible light and includes an electrode over a surface. In one nonlimiting embodiment of the invention, the electrode has two electrically conducting layers and a bridging layer between and interconnecting the two electrically conducting layers. In one nonlimiting embodiment, the bridging layer includes a high electrically resistance connecting layer to provide the electrode with a heating layer to heat the surface and/or a current conducting layer to pass current to the medium. In another nonlimiting embodiment, the bridging layer includes an electrically connecting layer to pass current to electrically enhance the first electrically conductive layer. In another nonlimiting embodiment, the electrically conducting layers are silver films to reduce infrared transmission through the first electrode assembly.

45 Claims, 5 Drawing Sheets

U.S. PATENT DOCUMENTS

| | | |
|---|---|---|
| 6,643,050 B2 | 11/2003 | Rukavina et al. |
| 6,667,825 B2 | 12/2003 | Lu et al. |
| 6,747,779 B1 | 6/2004 | Morin et al. |
| 6,828,062 B2 | 12/2004 | Lu et al. |
| 2002/0113168 A1 | 8/2002 | Rukavina et al. |
| 2004/0032638 A1 | 2/2004 | Tonar et al. |
| 2008/0013153 A1* | 1/2008 | McCabe et al. ............. 359/267 |

FOREIGN PATENT DOCUMENTS

| | | |
|---|---|---|
| RU | 2004114868 | 4/2002 |
| RU | 2004105943 | 9/2002 |
| WO | WO 03/012541 A2 | 2/2003 |
| WO | WO 03/034138 A1 | 4/2003 |

OTHER PUBLICATIONS

Rukavina, Thomas, U.S. Appl. No. 11/472,330, entitled Electrochromic Vision Panel Having a Pluraliy Of Connectors, filed Jun. 22, 2006.

Martin, Peter M., Guides To Vacuum Processing, "Electrochromic Thin Films", *Vacuum Technology & Coating*, Aug. 2005, pp. 28-30.

Minami et al, "Highly Transparent And Conductive Zinc-Stannate Thin Films Prepared By RF Magnetron Sputtering", *Japanese Journal of Applied Physics*, vol. 33 (1994) pp. L1693-L1696.

Enoki et al, "The Electrical And Optical Properties Of The $ZnO$-$SnO_2$ Thin Films Prepared by R.F. Magnetron Sputtering", Department of Materials Processing, Faculty of Engineering, Tohoku University, Sendai, 1992.

Enoki et al, "Electrical And Optical Properties Of The ZnO-Doped $CdO$-$SnO_2$ Films Prepared By R.F. Magnetron Sputtering", Department of Materials Processing, Faculty of Engineering, Tohoku University, Sendai, 1993.

Kluth et al, "Magnetron Sputtered Zinc Stannate Films For Silicon Thin Film Solar Cells", $3^{rd}$ *World Conference On Photovoltaic Energy Conversion*, May 11-18, 2003, Osaka, Japan, pp. 1800-1803.

* cited by examiner

TRANSPARENT ELECTRODE FOR AN ELECTROCHROMIC SWITCHABLE CELL

CROSS-REFERENCE TO RELATED APPLICATIONS

This application is related to U.S. patent application Ser. No. 11/472,331 entitled "A Vision Panel Having a Multi-layer Primer, " now U.S. Pat. No. 7,248,392 , and to U.S. patent application Ser. No. 11/472,330 entitled "An Electrochromic Vision Panel Having a Plurality of Connectors," now U.S. Pat. No. 7,173,750. These applications are both filed concurrently herewith and are herein incorporated by reference in their entirety.

BACKGROUND OF THE INVENTION

1. Field of the Invention

This invention relates to a transparent electrode for an electrochromic switchable cell, and more particularly, to a transparent electrode having a coating stack having a pair of electrically conducting layers separated by either an electrically conducting layer or a high electrically resistance layer such as a dielectric layer.

2a. Discussion of the Technology

Electrochromic switchable transparencies are often used when it is desired to vary visible light transmission through a transparency or glazing. For example and not limiting to the discussion, switchable transparencies are used for aircraft windshields and/or side windows to provide the operator of, and/or passengers in, the aircraft with the ability to increase or decrease the visible light transmittance of the transparency.

One type of an electrochromic transparency or system includes anodic compounds and cathodic compounds together in a solution between a pair of spaced electrode assemblies. Another type of system includes a polymer having a cathodic-coloring polymer, an electrically insulating but ionically conductive polymer and an anodic-coloring polymer between a pair of spaced electrode assemblies. Still another system includes an inorganic layer which is ionically conductive but electronically insulating between a pair of spaced electrode assemblies. For a more detailed discussion of the above-mentioned electrochromic systems, reference can be made to U.S. Pat. Nos. 5,202,787; 5,805,330; 6,643,050, and 6,747,779. As is appreciated by those skilled in the art, for an electrochromic mirror, at least one of the electrode assemblies is transparent, and for an electrochromic transparency preferably both electrode assemblies are transparent.

The electrode assembly in one arrangement includes an electrode mounted on the surface of a glass sheet. A pair of the electrode assemblies is mounted in spaced relationship to one another with the electrodes in facing relationship with one another and in electrical contact with the electrochromic medium between the electrodes. The electrodes are connected to electronic circuitry, such that when the electrodes are electrically energized, an electrical potential is applied to the electrochromic medium and causes the medium to change color. For example, but not limiting to the discussion, when the electrochromic medium is energized, it darkens and begins to absorb light to decrease the percent of visible light transmitted through the electrochromic medium, and when the medium is de-energized, it lightens to increase the percent of visible light transmitted through the medium. The percent reduction of visible light through the medium depends on the amount of voltage applied to the medium, e.g. as the applied voltage increases, the percent of visible light transmitted through the medium decreases. For a more detailed discussion on the operation of electrochromic switchable transparencies, reference can be made to above-mentioned U.S. Pat. Nos. 5,202,787; 5,805,330; 6,471,360, and 6,643,050.

The switching speed of the electrochromic switchable medium from maximum to minimum visible light transmission within the electrochromic medium transparency's range of visible light transmission is a function of several parameters discussed in the above-mentioned patents. For example and not limiting to the discussion, one of the parameters is the electrical conductivity of the electrodes, e.g. the sheet resistance of the electrodes contacting the electrochromic switchable medium. The sheet resistance is the resistance in ohms per square of the electrode measured between two points on the surface of the electrode designated to contact the electrochromic medium. The procedure for determining sheet resistance of electrodes is well known in the art, and no further discussion is deemed necessary.

As is appreciated by those skilled in the art, for a given applied voltage, as the sheet resistance of the electrode decreases the switching time from a maximum visible light transmission value to a minimum visible light transmission value decreases and vice versa. The decrease in switching time is a result of increasing the current through the electrodes and the electrochromic switching medium. In general, to obtain a uniform distribution of current between the electrodes, it is desirable for the electrodes to have a low sheet resistance, e.g. below 10 ohms per square.

It is also recognized in the art that temperature variations have an affect on the switching time, e.g. as the temperature decreases, the switching time increases and visa versa.

2b. Discussion of the Presently Available Technology

U.S. Pat. No. 5,805,330 discloses materials that can be used for electrodes of photovoltaic-powered electro-optic devices. The materials include fluorine doped tin oxide, tin doped indium oxide (hereinafter also referred to as "ITO"), thin metal layers, ITO/metal/ITO (hereinafter the combination also referred to as "IMI"), and additional layers of metal and ITO, e.g., IMIMI. U.S. Pat. No. 6,747,779 discloses electrodes of ITO/silver/ITO, silver/ITO and dielectric/silver/ITO with optional interposition of thin layers of partially oxidized metal at the silver-ITO interface.

U.S. Pat. No. 6,561,460 discloses a fog-preventing electrochromic pane assembly including a first substrate having a conductive coating on an outer first surface, and second conductive coating on an inner second surface, as well as a second substrate spaced from the first substrate, with the second substrate having a third conductive coating on outer first surface. The inner second surface of the first substrate and the outer first surface of the second substrate face each other in spaced-apart relation to define a chamber therebetween having an electrochromic medium. Electrical current is applied to the first conductive coating to heat the first conductive coating, which prevents fogging of the pane assembly, and an electrical potential is applied to the second and third conductive coatings to vary the transmittance of the electrochromic medium.

Although the fog-preventing electrochromic pane assembly of U.S. Pat. No. 6,561,460 is acceptable for its intended purpose, there are limitations. More particularly, a sheet having a coating on both surfaces has to be handled carefully to prevent surface damage to one or both of the coated surfaces.

As can be appreciated, it would be advantages to provide electrodes that provide a uniform distribution of current through the electrochromic medium, that provide facilities to heat one or more of the outer surfaces of the electrochromic switchable transparency, and/or that enhance solar protection of the electrochromic medium without having the limitations of the presently available transparent electrodes for electrochromic transparencies.

SUMMARY OF THE INVENTION

This invention relates to an article of the type having a first electrode assembly spaced from a second electrode assembly, and a medium between the first and second electrode assemblies. The medium in response to electric stimuli alters percent of visible light transmitted through the medium, e.g. the medium is an electrochromic switchable medium selected from the group of a liquid, a solid, a gel and combinations thereof. In one nonlimiting embodiment of the invention, the article is an electrochromic switchable transparency having at least one electrode assembly, e.g. the first electrode assembly, transparent to wavelengths in the range of 400-700 nanometers of the electromagnetic scale.

In one nonlimiting embodiment of the invention, the first electrode assembly has an electrode defined as a first electrode; the second electrode assembly having an electrode defined as a second electrode with the first and second electrodes in facing relationship to one another with the medium between the first and second electrodes. The first electrode assembly has a first major surface, e.g. a first surface of a glass sheet, facing the medium with the first electrode between the first major surface and the medium. The first electrode further includes a first electrically conductive layer between the medium and the first major surface, a second electrically conductive layer spaced from the first electrically conductive layer and between the first electrically conductive layer and the medium, first and second electrical contact members, e.g. bus bars, spaced from one another and contacting the first electrically conductive layer wherein the first and second electrical contact members and the first electrically conductive layer provide a first electrically conductive path, and a third electrical contact member contacting the second electrically conductive layer. A fourth electrical contact member contacts the second electrode wherein the third and fourth electrical contact members, the second electrically conductive layer, the medium and the second electrode provide a second electrically conductive path.

Other nonlimiting embodiments of the invention include the glass sheet having an opposite second surface with at least one of the surfaces of the glass sheet having a coating selected from the group of a hydrophobic coating, a hydrophilic coating, a solar control coating and combinations; a closed spacer frame between and joined to the electrode assemblies to provide a sealed chamber between the electrode assemblies to contain the medium; the article selected from the group of (A) a transparency of a vehicle of the type selected from the group of (a) land vehicles selected from the group of automobiles, trucks, cars, motorcycles, trains and combinations thereof; (b) air vehicles; (c) space vehicles; (d) above water vehicles; (e) below water vehicles, and (f) combinations thereof; (B) windows for structures selected from the group of (a) residential homes; (b) commercial buildings; (c) oven doors, (d) microwave doors; (e) refrigerator doors: and (f) combinations thereof; (C) mirrors); (D) vehicular rear view mirrors; (E) vehicular side view mirrors: (F) a vehicular transparency selected from the group of a windshield, a side window, a roof window and a rear window and combinations thereof, and an aircraft windshield, and (G) combinations thereof.

In an additional nonlimiting embodiment of the invention, the electric stimuli is measured in volts applied between the electrode assemblies and the medium in responsive to the electric stimuli alters percent of visible light transmitted through the medium in one of the following manners: as the voltage between the electrode assemblies increases, the percent transmission through the medium decreases; as the voltage between the electrode assemblies decreases, the percent transmission through the medium increases; as the voltage between the electrode assemblies increases, the percent transmission through the medium increases; as the voltage between the electrode assemblies decreases, the percent transmission through the medium decreases, and combinations thereof.

In still another nonlimiting embodiment of the invention, as voltage is applied between the first and second electrically conductive members, the first electrically conductive layer and the surface are electrically heated.

In an additional nonlimiting embodiment of the invention, a high electrical resistance connecting layer is between the first and second electrically conductive layers, the connecting layer has a predetermined resistance to electric current flowing along the first electrically conductive layer such that less than 50% of current moving along the first electrically conductive path passes through the connecting layer to the second electrically conductive layer. The invention contemplates the high electrical resistance connecting layer being an electrically insulating or dielectric layer.

In a further additional nonlimiting embodiment of the invention, an electrically conductive connecting layer is between the first and second electrically conductive layers, the connecting layer has a predetermined resistance to electric current flowing along the first electrically conductive layer such that greater than 50% of current moving along the first electrically conductive path passes through the electrically conductive connecting layer to the second electrically conductive layer. The invention contemplates the electrically conductive connecting layer being an electrically conductive metal oxide layer.

In still another nonlimiting embodiment of the invention, the second electrode assembly has a major surface defined as a second major surface facing the medium with the second electrode between the second major surface and the medium, the second electrode includes an electrically conductive layer defined as a third electrically conductive layer between the medium and the second major surface; an electrically conductive layer defined as a fourth electrically conductive layer spaced from the third electrically conductive layer and between the third electrically conductive layer and the medium. The fourth electrical contact contacts the fourth electrically conductive layer, and fifth and sixth electrical contact members spaced from one another contact the third electrically conductive layer wherein the fifth and sixth electrical contact members and the third electrically conductive layer provide a third electrically conductive path.

Additional other nonlimiting embodiments of the invention include (1) a dielectric layer between the first electrically conductive layer and the surface of the substrate, the dielectric layer between the substrate surface and the first electrically conductive layer including a support layer, e.g. a zinc stannate film, and a metal contact layer, e.g. a zinc oxide layer to enhance the electrical conductivity of the metal layer, e.g. a silver layer; (2) a high electrical resistance connecting layer between the first and second electrically conductive layers to heat the first surface while moving current through the medium along the second path; (3) an electrically conductive layer between the first and second electrically conducting layers to enhance current moving along the second path; (4) the first electrically conducting layer and/or the connecting layer including a support layer, e.g. a zinc stannate layer, and (5) each of the electrically conducting layers including a metal layer and a protective layer on the metal layer, optionally the protective layer is an oxygen deficient ceramic sputtered film, e.g. an indium tin oxide film, and further includes an electrically conductive sputtered ceramic film, e.g. an indium tin oxide film having more oxygen than the oxygen deficient ceramic sputtered film on the oxygen deficient ceramic film.

Other nonlimiting embodiments of the invention include the first and third electrical contact members connected to a positive or negative terminal of a direct current power supply, and the second and fourth electrical contacts are connected to the negative or positive terminals of the power supply, respectively, or the first and second electrical contact members are connected to a first direct current power supply, and the third and fourth electrical contact members are connected to a second direct current power supply.

The invention further relates to an improved article of the type having a first electrode assembly spaced from a second electrode assembly, and a medium between the first and second electrode assemblies, the medium in responsive to electric stimuli alters percent of visible light transmitted through the medium, the improvement includes at least one of the electrode assemblies including a surface; a first zinc stannate layer over the surface; a first zinc oxide layer over the first zinc stannate layer, and a metal layer on the first zinc oxide layer, e.g. a silver film on the zinc oxide layer, a protective film over or on the silver film and an indium tin oxide film over or on the protective layer.

The invention still further relates to a method of operating an electrochromic switchable cell of the type having a first electrode assembly spaced from a second electrode assembly, and an electrochromic switchable medium between the first and second electrode assemblies, the method includes the steps of providing the first electrode assembly with a first electrically conducting layer spaced from the major surface and in electrical contact with the electrochromic switchable medium and a second electrically conductive layer between the first electrically conductive layer and the major surface and spaced from the first electrically conducting layer and the electrochromic switchable medium, and at selected times, moving current through the first and/or the second electrically conductive layers.

BRIEF DESCRIPTION OF THE DRAWINGS

FIG. 5 includes FIGS. 5A and 5B, which are exploded views of nonlimiting embodiments of bus bar connections to electrodes of the invention.

DETAILED DISCUSSION OF THE INVENTION

Figure 1:
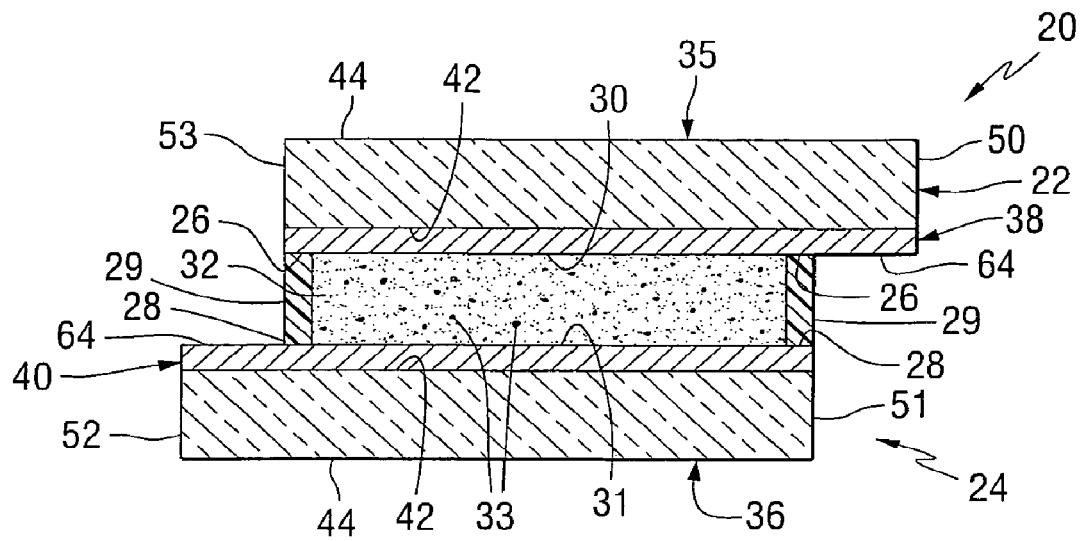
FIG. 1 is an elevated cross-sectional side view of a nonlimiting embodiment of an electrochromic switchable transparency of the invention.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, as used herein, the terms "deposited over", "applied over", or "provided over" mean deposited, applied, or provided on but not necessarily in surface contact with. For example, a material "deposited over" a substrate does not preclude the presence of one or more other materials of the same or different composition located between the deposited material and the sheet or substrate.

Before discussing nonlimiting embodiments of the electrodes, electrochromic cells or transparencies of the invention, it is understood that the invention is not limited in its application to the details of the particular nonlimiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

In the following discussion, the description of the invention is directed to a single chamber electrochromic switchable vehicular transparency. As is appreciated, the invention is not limited thereto, and the transparency incorporating features of the invention can have more than one chamber, e.g. the transparency can have 2, 3, 4 or more chambers and can be used as and/or be a component of a transparency for any type of vehicle including but not limited to land vehicles such as, but not limited to automobiles, trucks, cars, motorcycles, and/or trains; to air and space vehicles, and to above and/or below water vehicles. Further, the transparency incorporating features of the invention can be used as and/or be a component of any type of a vehicular transparency such as, but not limited to, a windshield, a side window, a roof window and a rear window. Still further, the transparency incorporating features of the invention can be used as and/or be a component of windows for residential homes, commercial buildings, oven doors, microwave ovens and refrigerator doors. In other nonlimiting embodiments of the invention, the electrodes and/or the electrode assemblies of the invention can be used with and/or be a component of electrochromic transparencies having only one transparent side, e.g. but not limited to mirrors, e.g. but not limited to vehicular interior mirrors and exterior side view mirrors, and can be used as and/or be a component of any type of electrochromic device.

Figure 2:
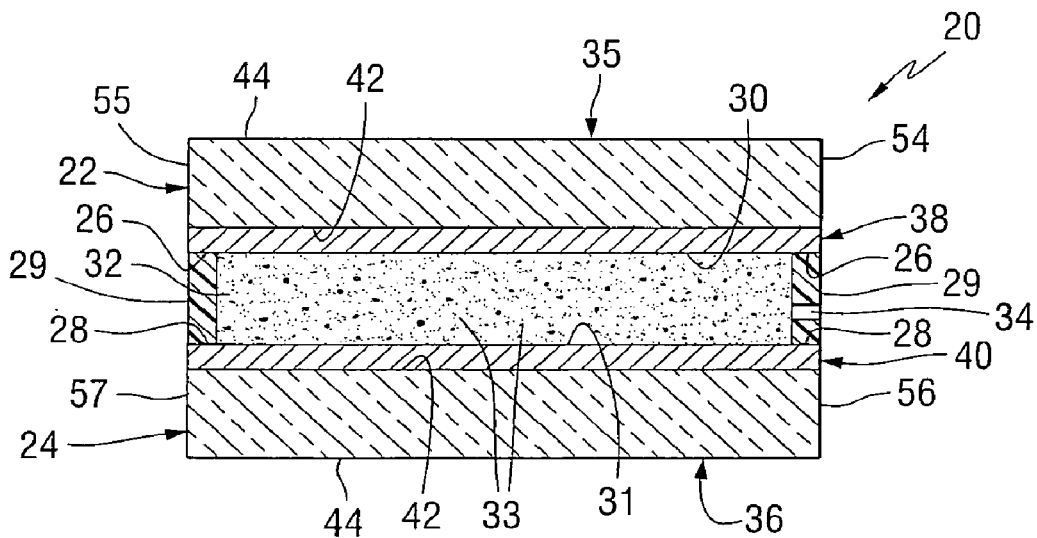
FIG. 2 is a view similar to view of FIG. 1 with the electrochromic switchable transparency shown in FIG. 1 rotated 90 degrees.

With reference to FIGS. 1 and 2, there is shown a nonlimiting embodiment of an electrochromic switchable cell or transparency 20 of the invention. The transparency 20 includes a pair of electrode assemblies 22 and 24 having their inner marginal edges 26 and 28, respectively, joined together by spacing element 29 to space inner surfaces 30 and 31 of the electrode assemblies 22 and 24, respectively, from one another to provide a sealed chamber 32 containing electrochromic switchable medium 33. In a nonlimiting embodiment of the invention, the inner surfaces 30 and 31 of the electrode assemblies 22 and 24, respectively, are spaced-apart and in a substantially parallel facing relationship with respect to each other. This relationship is preferably achieved through the spacing element 29. The spacing element 29 can be positioned between the marginal edges 26 and 28 of the electrode assemblies 22 and 24, respectively, in any manner capable of maintaining proper spacing between inner surfaces 30 and 31 of the electrodes 22 and 24 respectively. For example and not limiting to the invention, the spacing element 29 is shaped like a frame to define the outer limits or boundary of the sealed chamber 32. The spacing element 29 can be constructed of any material, and in one nonlimiting embodiment is a polymeric material, e.g. a curable organic polymeric material, such as a thermoplastic, thermosetting or UV curing resin material. Epoxy based organic sealing materials are particularly useful as the spacing element 29, and preformed spacing elements can be adhered to the marginal edges 26 and 28 of the electrode assemblies 22 and 24, respectively, in any usual manner, e.g. and not limiting to the invention, by a butyl moisture resistant adhesive sealant (not shown).

In one nonlimiting embodiment of the invention, the chamber 32 having the medium 33 is provided the following manner. A layer of an electrically insulating adhesive sealant (not shown) is provided between the inner marginal edges 26 of the inner surface 30 of the electrode assembly 22, and a surface a polymeric preformed spacer frame element 29, and a layer of an electrically insulating adhesive layer (not shown) is provided between the marginal edges 28 of the inner surface 31 of the electrode assembly 24 and an opposite surface of the spacer frame element 29. After the adhesive layers cure or set, the electrochromic medium 33 is moved in any convenient manner into the chamber 32, e.g. through a hole 34 (shown only in FIG. 2) in the spacer element 29, and thereafter, the hole 34 is sealed in any convenient manner, e.g. by a butyl moisture resistant adhesive sealant (not shown), to contain the electrochromic switchable medium 33 in the chamber 34. The thickness of the spacer element 29 is preferably equal to the thickness of the electrochromic medium 33 contained in the spacer element 29 so that the surfaces 30 and 31 of the electrode assemblies 22 and 24, respectively, contact the electrochromic medium.

Each of the electrode assemblies 22 and 24 includes a sheet or substrate 35 and 36, and an electrode 38 and 40, respectively. Each sheet 35 and 36 has an inner surface 42 and an outer surface 44 with the electrode 38 of the invention supported on, and preferably securely mounted on, the inner surface 42 of the sheet 35, and the electrode 40 of the invention supported on, and preferably securely mounted on, the inner surface 42 of the sheet 36. In the following discussion, the inner surface 30 of the electrode assembly 22 is also referred to as outer surface 30 of the electrode 38, and the inner surface 31 of the electrode assembly 24 is also referred to as the outer surface 31 of the electrode 40.

In one nonlimiting embodiment of the invention, side 50 of the electrode assembly 22 extends beyond side 51 of the electrode assembly 24, and side 52 of the electrode assembly 24 extends beyond side 53 of the electrode assembly 22 as shown in FIG. 1 to provide for electrical connections in any usual manner to the electrodes 38 and 40. Nonlimiting embodiments of electrical connections to the electrodes are discussed below. Sides 54 and 55 of the sheet 35 of the electrode assembly 22 or of the electrode assembly 22 are generally aligned with sides 56 and 57 of the sheet 36 of the electrode assembly 24, or the electrode assembly 24, respectively, as shown in FIG. 2. Other nonlimiting embodiments of the invention include the sides 50, and 53-55 of the sheet 35, or the electrode assembly 22 aligned with the sides 51, 52, 56 and 57 of the sheet 36, or the electrode assembly 24 respectively, and the sides 50, and 53-55 of the electrode assembly 22 off set from the sides 51, 52, 56 and 57 of the electrode assembly 24, respectively.

The invention contemplates having one or both of the electrode assemblies 22 and 24 transparent to visible light, and/or one or both of the sheets 35 and 36 transparent to visible light, and/or one or both of the electrodes 38 and 40 transparent to visible light, when the electrochromic cell 20 is in its "off", "uncolored" or "bleached" state, as discussed below in more detail. As can be appreciated when the electrochromic cell is used as a window or a see-through wall partition, both of the electrode assemblies are preferably transparent to visible light, and when the electrochromic cell is used to pass visible light only through one of the electrode assemblies, e.g. the electrochromic transparency 20 is used as a mirror or a wall partition having one transparent side, preferably only one of the electrode assemblies is transparent.

For purposes of the present invention, "transparent to visible light" or "transparent" means the total amount of visible light transmitted through an object, for example and not limited to the invention, through one electrode assembly, or through one electrode assembly and the electrochromic medium, or through the two electrode assemblies and the electrochromic medium between the two electrode assemblies. The term "visible light" means electromagnetic radiation having a wavelength in the range 400-700 nanometers of the electromagnetic spectrum. The invention is not limited to the percent of visible light transmitted through one electrode assembly, or through one electrode assembly and the electrochromic medium, or through the two electrode assemblies and the electrochromic medium between the two electrode assemblies of the electrochromic switchable transparency of the invention when the transparency is in the "off", "uncolored" or "bleached" state. In one nonlimiting embodiment of the invention, visible light transmission is greater than 0%, e.g. greater than 30%, or greater than 45%, or greater than 60%. The visible light transmittance is measured for CIE standard illuminant A.

The invention is not limited to the material of the sheets 35 and 36 of the electrode assemblies 22 and 24, respectively, and the sheets can be made from any material including, but not limited to polymeric materials, ceramic materials, glass-ceramic materials and glass materials. When one or both of the sheet 35 and 36 are designated to have greater than 0% visible light transmission, the sheet(s) can be made of a material transparent to visible light, e.g. but not limiting to the invention transparent polymeric materials, transparent soda-lime-silicate glass, transparent borosilicate glass, or any type of transparent refractory glass, and combinations thereof. When one or more of the sheets 35 and 36 are designated to have 0% visible light transmission, the sheet(s) can be made of a non-transparent material, e.g. and not limiting to the invention metal, non-transparent polymeric materials and/or the sheets 35 and 36 can be made of a substrate having visible light transmission greater than 0% and having a coating layer or film over one or both of the surfaces of the substrate having 0% visible light transmission, for example and not limiting to the invention, over the surfaces 42 and/or 44 of the sheets 35 or 36. One or both of the sheets 35 and/or 36 can be a monolithic sheet, or one or both of the sheets can be two or more laminated sheets, or two or more sheets separated by a spacer frame, for example but not liming to the invention, a multiple insulating unit, or combinations thereof.

The invention is not limited to the peripheral contour, shape and/or thickness of the sheets 35 and 36 of the electrode assembly 22 and 24, respectively. The sheets 35 and 36 can have three or more sides and the sides can be linear or non-linear. Although in the practice of the invention, the inner surface 42 of the sheets 35 and 36 are preferably uniformly spaced from one another to have uniform darkening of the switchable medium 33 in the chamber 32, and the surfaces 42 and 44 of the sheets substantially parallel to minimize distortion of the viewed object, the invention contemplates one or both of the sheets 35 and 36 having flat surfaces 42 and/or 44; being parallel or non-parallel to one another; having the surface 42 and/or 44 with a shape other than flat, for example, but not limiting the invention, a concave shape, convex shape, or a wedged shape as viewed in cross section. Wedged shaped glass is disclosed, among other places, in U.S. Pat. No. 5,812,332, which patent is hereby incorporated by reference. Further, the invention contemplates the spacing between the inner surfaces 42 of the sheets 35 and 36 varying from one side of the chamber 32 to the other side of the chamber.

As is appreciated by those skilled in the art, the invention is not limiting to the composition of the glass sheets 35 and 36, for example and not limited to the invention the glass sheets can be clear or tinted glass, for example, of the type disclosed in U.S. Pat. Nos. 5,030,592; 5,240,886; 5,593,929, and 5,792,559 which patents are hereby incorporated by reference. The glass sheets can be annealed glass, chemically tempered or thermally tempered glass, or heat-strengthen glass. In one nonlimiting embodiment of the invention, the glass is a chemically tempered glass available from PPG Industries, Inc., Pittsburgh, Pa., under the trademark Herculite® II. This glass has extremely high strength to weight ratio, allowing the glass sheet to be thinner and lighter than thermally tempered glass without compromising strength or optics. The glass sheets 35 and 36 can be identical in composition and/or properties, or the composition and/or properties of the sheets can be different from one another, for example and not limiting to the invention, one sheet can be tinted glass and the other sheet can be clear glass. In one nonlimiting embodiment of the invention, the sheets 35 and 36 are transparent clear soda-lime-silicate glass sheets.

Further, one or both of the sheets 35 and/or 36 can have a functional coating on the outer surface 44. The functional coatings include but are not limited to environmental coatings, hydrophobic coatings and/or coatings to remove moisture or surface contaminants such as photocatalytically-activated self-cleaning coatings as described in U.S. patent application Ser. No. 08/899,257 entitled "Photocatalytically-Activated Self-Cleaning Article and Method of Making Same" filed Jul. 23, 1997, in the name of Greenberg et al., now U.S. Pat. No. 6,027,766, or photoelectrolytically desiccating coatings as described in U.S. patent application Ser. No. 08/927,130 entitled "Photocatalytically-Desiccating Multiple-Glazed Window Units" filed Sep. 2, 1997, in the name of James P. Thiel, now U.S. Pat. No. 5,873,203, each of which is hereby incorporated herein by reference.

Figure 3:
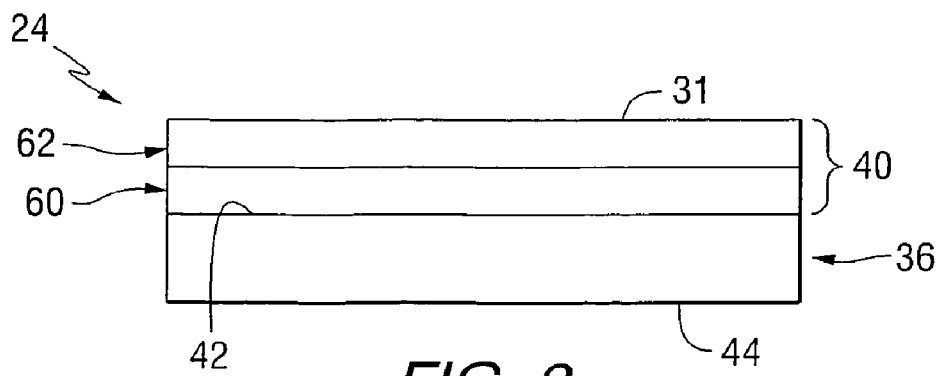
FIG. 3 is an elevated side view of a nonlimiting embodiment of an electrode assembly of the invention.

As shown in FIGS. 1 and 2, the inner surfaces 30 and 31 of the electrodes 38 and 40, respectively, face one another and are in electrical contact with the electrochromic switchable medium 34 in the chamber 32. With reference to FIG. 3, the following discussion is directed to the electrode assembly 24 and the electrode 40 of the electrode assembly 24 with the understanding that the discussion is applicable to the electrode assembly 22 and the electrode 38 of the electrode assembly 22 unless indicated otherwise. The electrode 40 of the invention includes a base layer 60 over the inner surface 42 of the sheet 36 and an activating layer 62 over the base layer 60. The term "layer" as used herein means one or more layers, or one or more films. The activating layer 62 has the surface 31 contacting the medium 33. The layers 60 and 62 of the electrodes 38 and 40 are deposited over the inner surface 42 of sheets 35 and 36 in any usual manner, for example, and not limiting to the invention by electroless coating, electric coating, pyrolytic coating or magnetically sputter vacuum deposition coating (hereinafter also referred to as "MSVD"). In the preferred practice of the invention, the layers 60 and 62 of the electrodes 38 and 40 are deposited by MSVD.

The surface 31 of the activating layer 62 (see FIG. 3) has a low sheet resistance, for example and not limiting to the invention, no greater than 20 ohms per square, and the activating layer 62 functions to, among other things, provide an electrically conductive path from outside the chamber 32, through the activating layer 62 of an electrode, e.g. the electrode 40, through the electrochromic medium 33 to the other electrode, e.g. the electrode 38, and through the activating layer of the electrode 38 to outside the chamber 32. The base layer 60 of the electrodes 38 and 40 functions as a solar control layer, a heatable layer, and/or an electrically enhancing layer for the activating layer 62, in a manner discussed below.

Figure 4:
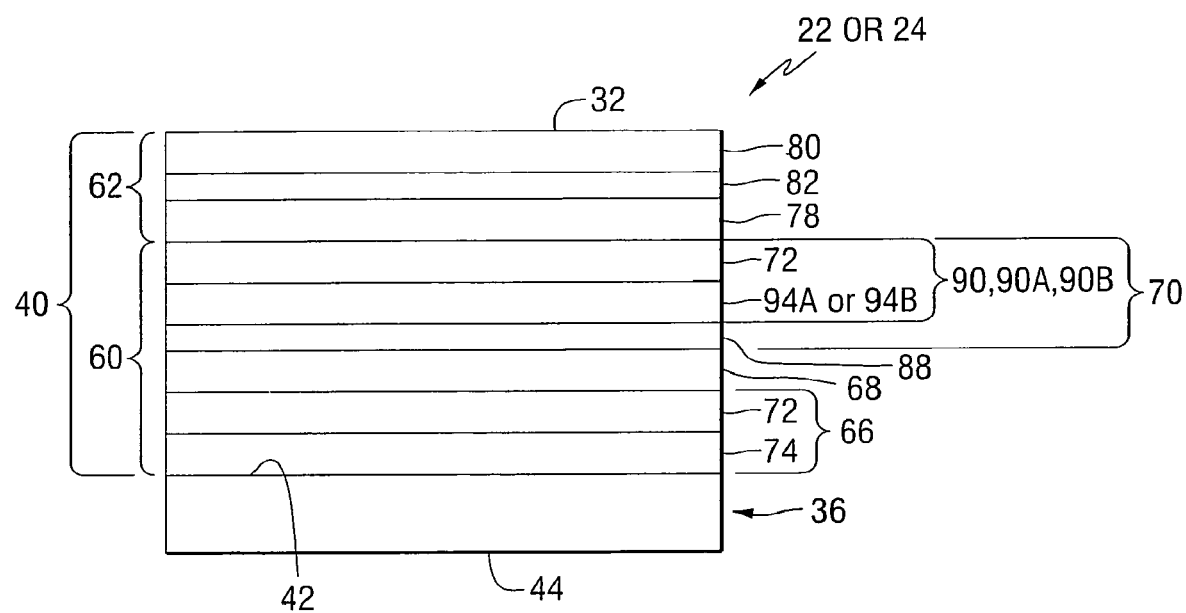
FIG. 4 is view similar to view of FIG. 3 showing in more detail another nonlimiting embodiment of an electrode assembly of the invention.

With reference to FIG. 4, in one nonlimiting embodiment of the invention, the base layer 60 includes a first layer or substrate contact layer 66 over and preferably on the inner surface 42 of the sheet 36, a metal layer 68 (hereinafter also referred to as "a first metal layer 68") over and preferably on the first layer 66 and a bridging layer 70 over and preferably on the metal layer 68. The metal layer 68 is not limiting to the invention and can be any suitable material for forming an electrically conductive path and optionally an infrared (wavelengths greater than 700 nanometers of the electromagnetic spectrum) reflective surface. Materials that can be used in the practice of the invention include but are not limiting to silver, gold, copper, aluminum, platinum and alloys thereof, e.g. but not limiting to the invention an alloy of silver with another metal, such as nickel or titanium, gold, copper, platinum, aluminum, silver or combinations thereof. It should be noted that certain metallic films, e.g. but not limiting to the invention, a silver film, has two levels of electrical resistivity and infrared reflectivity. More particularly, when the resistivity is at its lower level, the infrared reflectivity is at its higher level and vise versa. In the practice of the invention, when the infrared (hereinafter also referred to as "IR") reflecting layer is a silver film, it is preferred to have the resistivity of the silver film at its lower level and the infrared reflectivity at its higher level for reasons discussed below.

In one nonlimiting embodiment of the invention, the lower level of resistivity and higher level of infrared reflectivity of the metal layer 68 is achieved by the first layer 66 having certain special characteristics. In one nonlimiting embodiment of the invention, these characteristics include an atom arrangement conducive to deposition of the low resistance, high reflectivity, metallic layer 68, and chemical and heat stability. Usually, one film does not have all of the certain special characteristics discussed above; therefore, in one nonlimiting embodiment of the invention, the first layer 66 has two or more films, e.g. and not limiting to the invention, the first layer 66 is of the type disclosed in U.S. Pat. No. 5,821,001, the disclosure of which is hereby incorporated by reference, to improve the low resistance, high reflectivity properties of the metal layer 68. More particularly, and not limiting to the invention, the first layer 66 includes a metal-contact layer 72 in contact with the metallic layer 68, and a support layer 74 between the metal-contact layer 72 and the sheet 35 for the electrode assembly 22, and between the metal-contact layer 72 and the sheet 36 for the electrode assembly 24. The material of the metal-contact layer 72 has crystalline properties for causing the atoms forming the metal layer 68 to deposit in the lower of the two electrical resistivity levels and the higher of the two infrared reflectivity levels. The metal-contact layer 72 of the first layer 66 of the base layer 60 is chosen on the basis of an ability to cause the atoms of the metal layer 68 to deposit in a form characterized by a low resistivity level and a high infrared reflectivity level. The metal layer 68 and the metal-contact layer 72 coordinate with one another, by which is meant that a low resistivity level and a high infrared reflectivity level of the metallic layer 68 is associated with a particular structural character of the metal-contact layer 72 of the first layer 66. The crystal structure of the metallic layer 68 can, for instance, exhibit an orientation relationship with the metal-contact layer 72 that, in turn, can result in larger grains, or alternatively speaking, smaller grain boundary area, or less of other electron scattering defects, within the metal layer 68.

In general, the material chosen for the metal-contact layer 72 will depend on the identity of the metallic layer. In one nonlimiting embodiment of the invention, the metal layer 68 is a silver film 68. A silver film is preferred because it is economical and easy to deposit by MSVD and reflects infrared energy. In the case where the metallic layer 68 is a silver film, an example of a suitable material for the metal-contact layer 72 of the first layer 66 of the base layer 60 is a zinc oxide film. In depositing the zinc oxide film, care must be taken to select process parameters that provide the zinc oxide film with a suitable crystallinity or preferential crystal growth orientation for favorably affecting deposition of the silver atoms and improve the silver film's low resistivity, high reflectivity properties. One way of doing this is to have a preponderance of oxygen over argon during the sputtering of a cast zinc metal target. Other suitable materials for the metal-contact layer 72 of the first layer 66 include, but are not limited to, zinc aluminum oxide sputtered from a ceramic tile of appropriate composition, and indium tin oxide.

The support layer 74 supports the metal-contact layer 72, and can include one or more films. In one nonlimiting embodiment of the invention, the support layer 74 includes at least one film that has chemical and thermal resistant properties. Suitable materials for the support layer include, but are not limited to an amorphous sputtered oxide of zinc and tin (also referred to herein as "zinc stannate") and an amorphous oxide of tin or bismuth. For a high transmission and low emissivity application, the film(s) of the support layer 74 preferably are non-absorbing in the visible and infrared portion of the electromagnetic spectrum. In one nonlimiting embodiment of the invention, the support layer 74 is a film of zinc stannate because of its stronger bonding to the inner surface 42 of the glass sheets 35 and 36, and because of its greater chemical durability (zinc stannate is not readily attacked by acid or base solutions) and thermal durability (zinc stannate can be heated to temperatures up to 1200° F. without deterioration). A more detailed discussion of the properties of zinc stannate is discussed in U.S. Pat. No. 4,610,771, the disclosure of which is incorporated herein by reference.

The invention is not limited to the weight percent of tin and zinc in the zinc stannate film; more particularly, the zinc stannate film can have 10-90% by weight of tin and 90-10% by weight of zinc; 10-40% by weight tin and 60-90% by weight zinc; 34% by weight tin and 66% by weight zinc; 53% by weight tin and 47% by weight zinc, or 48% by weight of tin and 52% by weight zinc.

Since only atoms in the vicinity of the surface of the metal-contact layer 72 have an effect on the depositing atoms of the metallic layer 68, the thickness of the metal-contact layer should, as a general rule, be minimized to that which is required to obtain the desired lowering of the electrical resistance and increasing of the infrared reflectivity of the metal layer 68, e.g. the silver film 68 as explained above, so that the thickness of the more chemically and thermally durable support layer 74 can be maximized. Thickness ranges for the films of the first layer 66 are discussed below.

As can be appreciated, the invention is not limited to the number of films included in the first layer 66, and the first layer 66 can having more or less than two films, e.g. only one film of zinc oxide or only one film of zinc stannate between the metal layer 68 and the sheet 35 and/or 36. Further, the invention is not limited to the composition of the film(s) of the first layer 66, and the first layer can use any of the films, e.g. dielectric films used in the art between a metal film and a substrate, e.g. a plastic or glass sheet.

As is appreciated by those skilled in the art, in those instance when the surface of the first layer 66 contacting the surface 42 of its respective one of the sheets 35 and 36 does not form a good bond with the surface 42, a primer layer (not shown) can be used to secure the first layer 66 of the electrode 38 and/or 40 to the surface 42 of its respective sheet 35 or 36. For example, and not limiting to the invention, primer layers of the type disclosed in U.S. patent application Ser. No. 11/472,331 entitled "A Vision Panel Having a Multi-layer Primer, " now U.S. Pat. No. 7,248,392, can be used when the sheets 35 and/or 36 are plastic sheets, e.g. to secure the first layer 66 of the electrode 38 and/or 40 to the surface 42 of its respective plastic sheet 35 or 36.

Nonlimiting embodiments of the invention contemplate the part sequence of the first layer 66 of the base layer 60 on the sheet to include but not be limited to: the sheet 35 or 36/the first layer 66/the metal layer 68; the sheet/the metal supporting layer 74/the metal-contact layer 72/the metal layer 68; a glass sheet/ a dielectric layer/ a metal layer; a glass sheet/a first dielectric film/a second dielectric film/ a metal film, and a glass sheet/a film of zinc stannate/a film of zinc oxide/ a film of silver.

The bridging layer 70 of the base layer 60 is deposited over the first metal layer 68 of the base layer 60. The bridging layer 70 of the invention has different functions depending on the desired configuration and operation of the electrodes 38 and/ or 40. For a full appreciation of the bridging layer 70, the discussion is now directed to the activating layer 62, and thereafter, the discussion is directed to the bridging layer 70.

The activating layer 62 of the invention is deposited over the bridging layer 70 of the base layer 60. The activating layer 62 for one of the electrodes, e.g. the electrode 38, passes electric current to the electrochromic medium 33, and for the other one of the electrodes, e.g. the electrode 40, receives current from the electrochromic medium. The surface 32 of the electrodes 38 and 40 contacting the medium 33 is preferable compatible with the medium, e.g. the medium will not corrode or rapidly corrode the surface 32 of the electrodes 38 and 40, and the surface of the electrodes will not contaminate the medium.

As is appreciated by those skilled in the art, metals are excellent conductors of electric current, however, not all metals are, e.g. silver and metal alloys, compatible with the electrochromic medium used in electrochromic switching cells. Further as is appreciated by those skilled in the art, most metal oxides are more compatible than metals with the electrochromic medium used in electrochromic switching cells, however, most metal oxides are not as good conductors of electric current as metals. In view of the forgoing, in one nonlimiting embodiment of the invention (see FIG. 4), the activating layer 62 includes an electrically conductive metal oxide layer 80 over a metal layer 78 (hereinafter also referred to as "a second metal layer 78"). To prevent oxidation of the second metal layer 78 during the sputtering of the conductive metal oxide layer 80, a protective layer or sacrificial layer 82 is applied over the second metal layer 78, as is known in the art, before sputtering the metal oxide layer 80 over the second metal layer 78.

Materials that can be used in the practice of the invention for the second metal layer 78 include materials discussed above that can be used for the first metal layer 68. The invention is not limited to the material of the metal oxide layer 80, however, the material selected should be electrically conductive and should be compatible with the electrochromic medium 33, e.g. and not limiting to the invention, should not impair or damage the switching properties of the medium. The metal oxide layer 80 for transparent electrodes should be transparent and in one nonlimiting embodiment, antireflective. Materials that can be used in the practice of the invention for the conductive metal oxide layer 80 include but are not limited to materials selected from the group of conductive metal oxides, metal alloys, conductive oxy-nitrides and conductive nitrides. In another nonlimiting embodiment of the invention, the layer 80 is a metal oxide rendered conductive by doping, which include but are not limited to doped tin oxide, in particular tin oxide doped with a halogen, e.g. fluorine ($SnO_2$: F) or with antimony ($SnO_2$: Sb), or zinc oxide doped, for example, with aluminum (ZnO:Al) or with tin (ZnO:Sn) or with fluorine (ZnO:F) or with indium (ZnO:In); tin-doped indium oxide (ITO); electrically conductive zinc stannate; cadmium stannate; indium doped tin oxide, and combinations thereof. In still another nonlimiting embodiment of the invention, the conductive metal oxide layer 80 is an indium tin oxide layer or zinc aluminum oxide layer. In the preferred practice of the invention, but not limiting the invention thereto, the conductive metal oxide layer 80 is an indium tin oxide layer.

Materials that can be used in the practice of the invention for the protective layer 82 include metals such as, but not limited to zirconium, titanium, copper metal oxides and metal nitrides such as, but not limited to non-stoichiometric indium tin oxide and titanium nitride. More particularly, a film of non-stoichiometric indium tin oxide is obtained by sputtering an indium tin oxide cathode in an inert atmosphere, such as, but not limited to 100% argon gas. Stoichiometric indium tin oxide, on the other hand, is obtained by sputtering an indium tin oxide cathode in a reactive atmosphere, such as, but not limited to 5% oxygen, 95% argon. In one nonlimiting embodiment of the invention, the protective layer 82 is applied over the second metal layer 78 by sputtering a cathode target of a material in a non-reactive atmosphere, e.g. sputtering a copper target in an argon atmosphere, and sputtering the second metal oxide layer 80 over the protective layer 82 by sputtering a cathode target of a different material in a reactive atmosphere, e.g. sputtering an indium tin oxide target in a reactive atmosphere. In another non-limiting embodiment of the invention, the protective layer is deposited over the second metal layer 78 by sputtering a ceramic cathode target in a non-reactive atmosphere, e.g. sputtering an indium tin oxide cathode target in an argon atmosphere, to deposit the protective layer 82 and thereafter sputtering the indium cathode target in a reactive atmosphere to deposit the metal oxide layer 80. As is appreciated, the invention is not limited to sputtering an indium tin oxide cathode target in an inert atmosphere followed by sputtering the target in a reactive atmosphere to provide the protective layer 82 and the conductive metal oxide layer 80, and other ceramic materials can be used in the practice of the invention, such as, but not limited to, the ceramic materials disclosed in U.S. Pat. No. 6,398,925, which include but are not limited to electrically conductive zinc stannate, antimony doped tin oxide, cadmium stannate, fluorine doped tin oxide, indium doped tin oxide, tin doped indium oxide, indium doped zinc oxide, and combinations thereof.

Nonlimiting embodiments of the activating layer 62 of the invention include, but are not limited to a metal layer (78)/a protective layer (82)/an electrically conductive metal oxide layer (80)); a metal layer/a protective layer deposited as a metal layer/an electrically conductive metal oxide layer; a silver film/a copper film deposited in an inert atmosphere/an indium tin oxide film, and a silver film/an indium tin oxide film deposited in an inert atmosphere/an indium tin oxide film deposited in a reactive atmosphere.

With continued reference to FIG. 4, the discussion is now directed to the bridging layer 70 of the base layer 60 of the electrodes 38 and 40 (only electrode 40 shown in FIG. 4). As discussed above, the discussion directed to the electrode 40 is applicable to the electrode 38 unless indicated otherwise. The bridging layer 70 includes a protective or sacrificial layer 88 over the first metal layer 68 and a connecting layer 90 between the activating layer 62 and the protective layer 88. The above discussion regarding the protective layer 82 of the activating layer 62 is applicable to the protective layer 88 of the bridging layer 70 unless indicated otherwise.

The connecting layer 90 of the bridging layer 70 physically separates the first metal layer 68 of the base layer 60 and the second metal layer 78 of the activating layer 62 to provide the electrode 40 with two electrically conducting layers, and optionally two infrared reflecting layers. The two infrared reflecting layers, e.g. the first and second metal layers 68 and 78, respectively, reduce the percent of the infrared energy transmission, e.g. wavelengths of the electromagnetic spectrum above 700 nanometers through the electrode assemblies 22 and/or 24. This reduction in infrared energy transmission, can reduce the adverse effect of infrared energy on the electrochromic medium 33 and can reduce heat loss through the electrochromic transparency 20, e.g. heat moving through the cell from the vehicle interior to an exterior cold environment, and heat moving through the cell from a heated exterior environment to a cool vehicle interior.

In one nonlimiting embodiment of the invention, the connecting layer 90 of the bridging layer 70 of the base layer 60 is an electrically conductive connecting layer 90A to provide the electrode with an electrically conducting path that includes the first metal layer 68 of the base layer 60; the electrically conducting connecting layer 90A of the base layer 60, and the activating layer 62. The term "electrically conductive connecting layer" means that the connecting layer 90A has an electrical resistance such that at least 50%, e.g. 75-100%, or 90-100% of the current applied to the first metal layer 68 of the base layer 60 passes through the connecting layer 90A to the second metal layer 78 of the activating layer 62 so as to increase, i.e. enhance the level of current flow through the second metal layer 78. For example, if a 2 amp current is applied to the first metal layer 68 of layer 60 and 60% of the current applied to the first metal layer 68 passes through connecting layer 90A to the second metal layer 78 of activating layer 62, the second layer 78 would received 60% of the applied current, or 1.2 amps, and the first metal layer 68 would have 40% of the applied current, or 0.8 amps. Combining the metal layers 68 and 78, in effect increases the thickness of the conducting path of the electrode, which has the affect of decreasing the time to switch the electrochromic medium from a high visible light transmission to a lower visible light transmission as discussed above.

In one nonlimiting embodiment of the invention, the electrically conductive connecting layer 90A is one or more of the electrically conductive metal oxide layers discussed above. In another nonlimiting embodiment of the invention, the connecting layer 90A is an indium tin oxide film or an electrically conductive zinc stannate film. In still another nonlimiting embodiment of the invention, the metal layer 78 of the activating layer 62 is a silver film on the connecting layer 90A and the electrically conductive connecting layer 90A includes a support film 94A of an electrically conductive zinc stannate layer on the protective layer 88 and the metal contact film 72 on the layer 94A. As is appreciated by those skilled in the art, the protective layers 82 and 88, and the metal supporting layer 72 of the connecting layer 90A to the extent they are electrically non-conductive, their contribution of resistance to the flow of electrical current is considered minimal because their expected thickness is small, e.g. in one nonlimiting embodiment of the invention, the protective layers 82 and 88 are copper films having a thickness of less than 25 angstroms, and the metal supporting layer 72 of the connecting layer 90A is a zinc oxide film having a thickness in the range of 50-80 angstroms.

In another nonlimiting embodiment of the invention, the connecting layer 90 is a high electrical resistance connecting layer 90B to limit the flow of current from the first metal layer 68 of the base layer 60 to the second metal layer 78 of the activating layer 62. The term "high electrical resistance connecting layer" means that the connecting layer 90B has an electrical resistance higher than the electrical resistance between the activating layer 62 of one electrode, e.g. the electrode 40 and the activating layer 62 of the other electrode, e.g. the electrode 38 such that less than 50%, e.g. 0-25% or 0-10% of the current applied to the first metal layer 68 of the base layer 60 of the electrodes passes through the connecting layer 90B to the second metal layer 78 of the activating layer 62. In one nonlimiting embodiment of the invention, the connecting layer 90B is a dielectric layer of the type used in low emissivity sputtered coated glass art. In another nonlimiting embodiment of the invention, the connecting layer 90B includes a dielectric layer 94B, e.g. an aluminum silicate film. In still another nonlimiting embodiment of the invention, the second metal layer 78 is a silver film on the connecting layer 90B, and the connecting layer 90B includes a dielectric layer 94B, e.g. a dielectric zinc stannate film on the protective layer 88, and the metal contact film 72, e.g. a zinc oxide film on the dielectric layer 94B.

In the instance when the outer surface 44 of the sheets 35 and 36 are to be heated to remove fog from the outer surfaces, and/or to heat the electrochromic medium 33 for faster switching in cold weather, current is moved through the first metal layers 68 of the base layers 60 of each of the electrodes 38 and 40 to heat the sheets 35 and 36, and/or the electrochromic medium. In the instance when the visible light transmission of the electrochromic switching medium 33 is to be changed, current is moved through the activating layer 62 of one electrode, e.g. the electrode 40, through the electrochromic medium 33 to the activating layer 62 of the other electrode, e.g. the electrode 38. As can now be appreciated, the high electrical resistance connecting layer 90B prevents or limits the current moving through the first metal layer 68 of the base layer 60 from moving to or from the metal layer 78 of the activating layer 62. As can be appreciated, the invention is not limited to the use of coating films for the high electrical resistance connecting layer 90B, and the invention contemplates providing an electrical insulating sheet, e.g. but not limiting to the invention, a plastic layer, e.g. and not limited to an interlayer plastic sheet of the type used to make laminated automotive windshields secured to the first metal layer 68 or the protective layer 88, and the activating layer 62 coated on the interlayer sheet; a polyester film of the type sold by E. I. Du Pont de Nemours and Company, Delaware, under the registered trademark MYLAR having the activating layer 62 coated on one surface and the opposite surface adhered to the first metal layer 68 or the protective layer 88, or a solidified liquid film of plastic, e.g. an acrylic liquid film applied to the metal layer 68 or the protective layer 88, cured and the activating 62 coated on the cured acrylic film (see FIG. 4). Using the above described techniques, the glass sheets 35 and 36 and/or medium 33 can be heated while the visible light transmission of the electrochromic medium changes. Bus bars can be connected to the electrodes and one or more power supplies connected to the bus bars to accomplish the forgoing in any convenient manner, e.g. as discussed below, and such bus bars, power supplies and electrical connections are not limiting to the invention.

Nonlimiting embodiments of the connecting layer 70 over the first metal layer 68 of the base layer 60 of the electrodes 38 and/or 40 of the invention having an electrically conductive connecting layer 90A include, but are not limited to, the first metal layer 68/conductive metal oxide layer; first metal layer 68/protective layer 88/indium tin oxide; first metal layer 68/protective layer of indium tin oxide/indium tin oxide, and a first silver metal layer 68/a copper film deposited on the silver layer/an indium tin oxide film deposited on the copper film. Nonlimiting embodiments of the connecting layer 70 over the first metal layer 68 of the base layer 60 of the electrodes 38 and/or 40 of the invention having a high electrical resistance connecting layer 90B include, but are not limited to, the first metal layer 68/a sheet of insulating material, e.g. plastic sheet; first metal layer 68/dielectric layer; first metal layer 68/protective layer 88/a thick zinc oxide film, e.g. at least 100 angstroms; first metal layer 68/protective layer/dielectric layer of zinc stannate, and a first silver metal layer 68/a copper film deposited on the silver layer/dielectric layer of zinc stannate deposited on the copper film and a zinc oxide film deposited on the zinc stannate film.

Figure 5B:
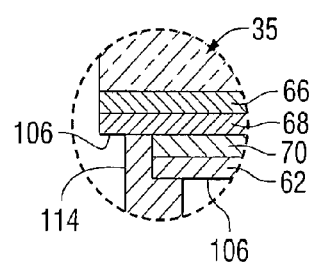
FIG. 5 is view similar to the view of FIG. 1 showing another nonlimiting embodiment of an electrochromic switchable transparency of the invention.
Figure 5A:
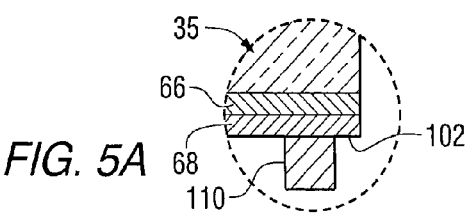
Figure 5:
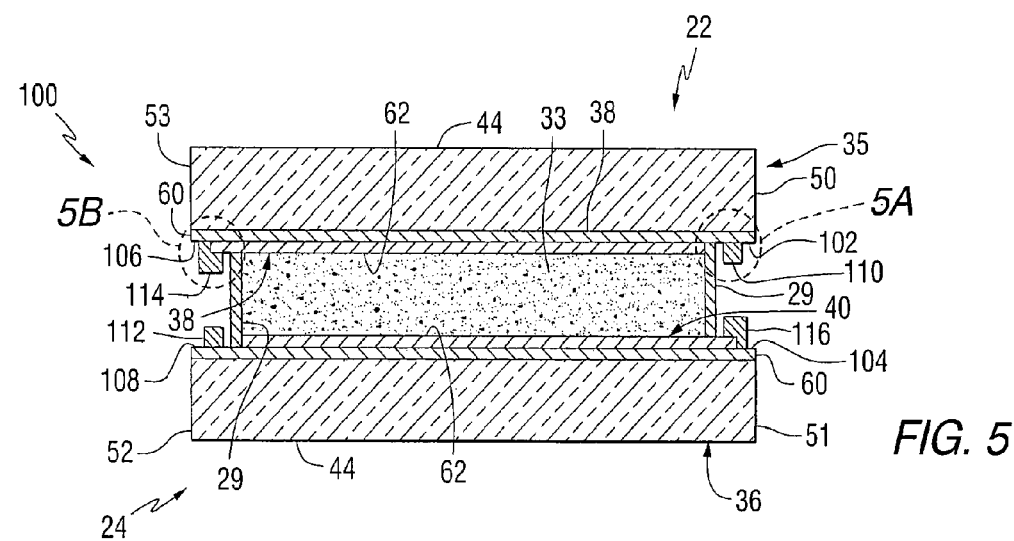

Shown in FIG. 5 is a nonlimiting embodiment of an electrochromic switchable transparency 100 of the invention that can be used to pass current through the electrodes 38 and 40, and the electrochromic medium 33 to darken the medium 33, and/or pass current through the electrodes 38 and 40 to heat the outer surface 44 of the sheets 35 and 36, and the electrochromic medium 33. The electrochromic switchable transparency 100 is similar to the electrochromic switchable transparency 20 shown in FIGS. 1 and 2 with the differences now discussed. The sides 50 and 53-55 of the sheet 35 are aligned with their respective ones of the sides 51, 52, 56, 57 of the sheet 36 (see FIGS. 2 and 5). The spacer element 29 is aligned with the sides 54 and 55 of the sheet 35 and with sides 56 and 57 of the sheet 36 as shown in FIG. 2. The spacer element 29 is inward of the sides 50 and 51 of the sheets 35 and 36, respectively, as shown in FIG. 5 to provide a first outward portion 102 of the electrode 38 and a first outward portion 104 of the electrode 40, and the spacer element 29 is inward of the sides 53 and 52 of the sheets 35 and 36, respectively, to provide a second outward portion 106 of the electrode 38 and a second outward portion 108 of the electrode 40. The first outward portion 102 of the electrode 38 (see FIGS. 5 and 5A) and the second outward portion 108 of the electrode 40 (see FIG. 5) each have a bus bar 110 and 112, respectively, contacting the first metal layer 68 of the base layer 60 of the electrode 38 and 40, respectively, as shown in FIG. 5A for the bus bar 110. The second outward portion 106 of the electrode 38 (see FIGS. 5 and 5B) and the first outward portion 104 of the electrode 40 (see FIG. 5) each have a bus bar 114 and 116, respectively, contacting the first metal layer 68 of the base layer 60 and the activating layer 62 of the electrodes 38 and 40, respectively, as shown in FIG. 5B for the bus bar 114.

The activating layers 62 of the electrodes 38 and 40 can be omitted from the first outward portion 102 of the electrode 38 (see FIG. 5A) and the second outward portion 108 of the electrode 40 (see FIG. 5), and the bridging layer 70 can be deleted from outward portions 102, 104, 106 and 108 of electrodes 38 and 40 (see FIGS. 5, 5A and 5B) in any usual manner, e.g. and not limiting to the invention by using a mask during the sputtering process as is known in the art, or by abrasively removing any unwanted layers.

Figure 6:
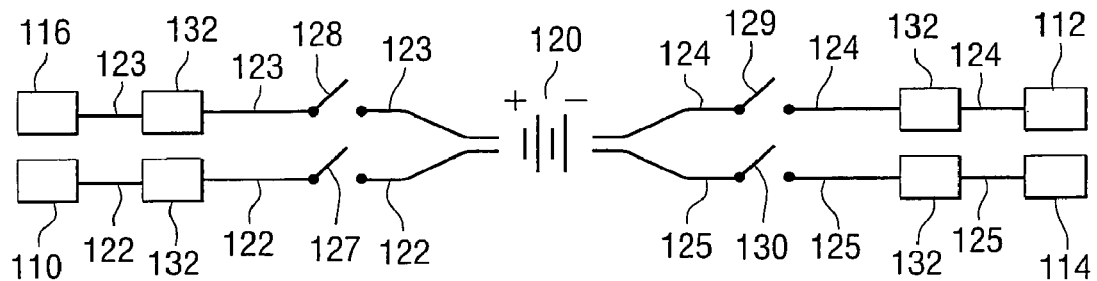
FIG. 6 is a schematic of a nonlimiting embodiment of an electronic circuit that can be used in the practice of the invention to power the electrodes of the electrochromic switchable transparency shown in FIG. 5.

With reference to FIG. 6, in one nonlimiting embodiment of the invention, the bus bars 116 and 110 are connected to positive terminal of a direct current power source 120 by wires 122 and 123, respective, and the bus bars 112 and 114 are connected to the negative terminal of the power source by the wires 124 and 125 respectively. Switches 127 and 128 are provided between the bus bars 110 and 116, respectively, and the positive terminal of the power supply 120, and switches 129 and 130 are provided between the bus bars 112 and 114, respectively, and the negative terminal of the power supply 120, to electrically connect and disconnect their respective bus bar to the power supply 120. More particularly, with the switches 127 and 129 in the open position and the switches 128 and 130 in the closed position, current flows between the bus bars 116 and 114, the activating layers 62 of the electrodes 38 and 40 and through the electrochromic medium 33 to change the visible light transmittance of the electrochromic medium. With the switches 127 and 130 in the open position and the switches 128 and 129 in the closed position, current flows between the bus bars 116 and 112 and through the metal layer 68 of the electrode 40 to heat the sheet 36 and the electrochromic medium 33. With the switches 128 and 129 in the open position and the switches 127 and 130 in the closed position, current flows between the bus bars 110 and 114 and through the metal layer 68 of the electrode 38 to heat the sheet 35 and the electrochromic medium 33. With the switches 127-130 in the closed position, current flows between the bus bars 110, 112, 114 and 116, through the metal layers 68 of the electrodes 38 and 40 to heat the sheets 35 and 36 and the electrochromic medium, and current flows through the activating layers 62 of the electrodes 38 and 40 and the electrochromic medium 33 to change the visible light transmittance of the electrochromic medium. In one nonlimiting embodiment of the invention, a variable resistor 132 is provided between the bus bars 110 and 116, and the positive terminal, and a variable resistor 132 is provided between the bus bars 112 and 114, and the negative terminal of the power supply 120 to control the flow rate of current through the metal layers 68 and the activating layers 62 of the electrodes 38 and 40 such that there is sufficient current flow through the medium 33 to achieve the desired rate of change in the visible light transmittance of the medium 33. Since the electrical circuit discussed above is relatively simple to those skilled in the art, no further discussion of the circuit is deemed necessary.

Figure 7:
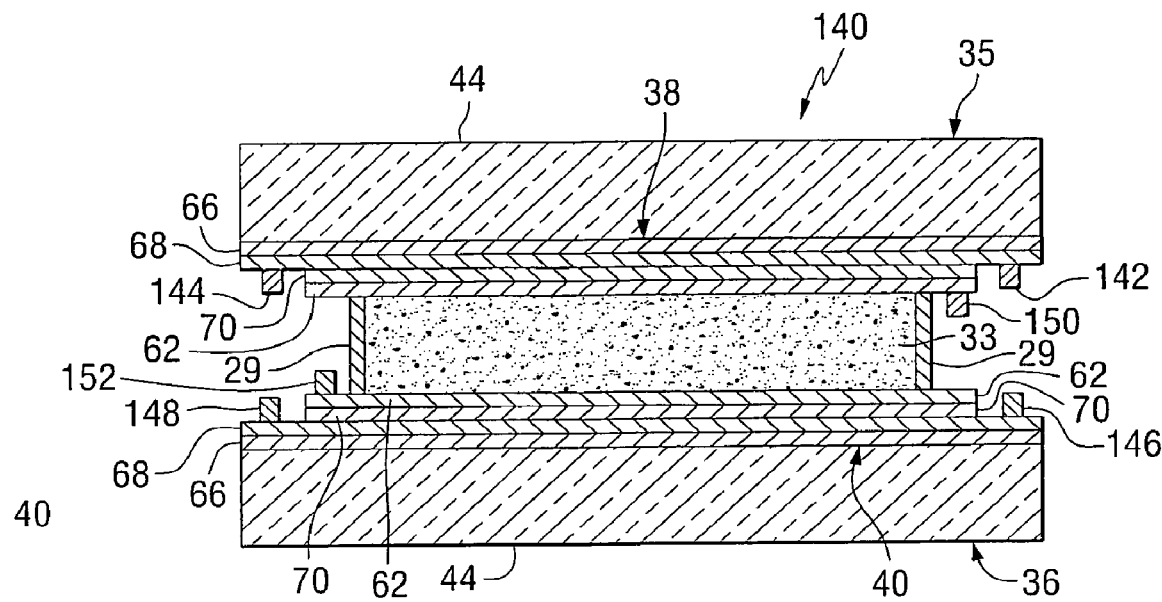
FIG. 7 is view similar to the view of FIG. 1 showing another nonlimiting embodiment of an electrochromic switchable transparency of the invention.
Figure 7A:
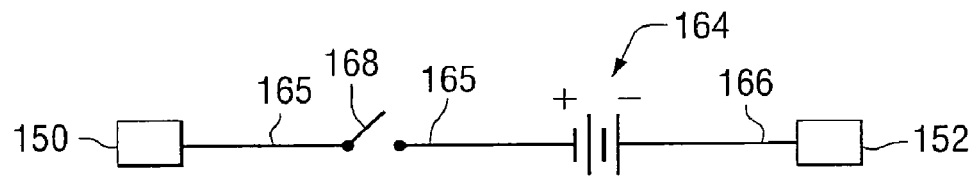
FIGS. 7A and 7B are schematics of nonlimiting embodiments of electronic circuits of the invention connected to the electrodes of FIG. 7 to power the electrodes in accordance to the invention.

With reference to FIG. 7, there is shown another nonlimiting embodiment of the invention comprising an electrochromic switchable transparency 140 that passes a different, e.g. a higher voltage through the first metal layers 68 than through the activating layers 62 of the electrodes 38 and 40. The transparency 140 includes bus bar 142 connected to one side of the first metal layer 68, and bus bar 144 connected to the opposite side of the first metal layer 68, of the electrode 38; bus bar 146 connected to one side of the first metal layer 68, and bus bar 148 connected to the opposite side of the metal layer 68, of the electrode 40; bus bar 150 connected to one or more sides of the activating layer 62 of the electrode 38, and bus bar 152 connected to one or more sides of the activating layer 62 of the electrode 40. With reference to FIG. 7A, the bus bars 144 and 148 are connected by wires 154 and 155, respectively, to the positive terminal, and the bus bars 142 and 146 are connected by wires 156 and 157, respectively, to the negative terminal of the direct current power supply 160. Optionally, a switch 162 is provided between the bus bar 144, and a switch 163 is provided between the bus bar 148, and the positive terminal of the power source 160 to selectively move current through their respective one of the first metal layers 68 of the electrodes 38 and 40 to heat the sheets 35 and 36, respectively, and the electrochromic medium 33.0.

With continued reference to FIG. 7A, the bus bar 150 is connected to positive terminal of a direct current power source 164 by wire 165, and the bus bar 152 connected to the negative side of the power source 164 by wire 166. Optionally, a switch 168 is provided between the bus bar 150 and the power supply 164 to selectively move current through the activating layers 62 to change the visible light transmission of the medium 33. The voltage of the power supplies 120 (FIG. 6), and 160 and 164 (see FIG. 7A) are not limiting to the invention. The voltage across the medium 33 should be high enough change the visible light transmission of the medium without damaging the medium 33. More particularly, it is recognized that voltages above 1.5 volts causes electrolysis of any water and/or moisture present in the switching medium 33, which can permanently damage the switching medium, and the medium 33 will no longer switch. Although not limiting to the invention, generally voltages no greater than 5 volts, e.g. no greater than 2 volts, or no greater than 1.5 volts, or no greater than 1.2 volts, are applied across the electrodes 38 and 40, e.g. and not limiting to the invention, through the activating layers 62 of the electrodes 38 and 40, and through the medium 33.

The voltages moving through the first metal layers 68 of the electrodes 38 and 40 to heat the sheets 35 and 36 and the medium 33 are preferably similar to voltages applied to the coatings of heatable windshields, e.g. as discussed in U.S. Pat. No. 6,561,460, which patent application is hereby incorporated by reference. Nonlimiting embodiments of the invention include the power supply 160 having an output of 40 volts, 20 volts, 14 volts or 12 volts.

In the practice of the nonlimiting embodiment of the invention shown in FIGS. 7 and 7A, with the switches 163 and 168 in the open position and the switch 162 in the closed position, current moves through the metal layer 68 of the electrode 38 to heat the sheet 36 and the electrochromic medium 33; with the switches 162 and 168 in the open position and the switch 163 in the closed position, current moves through the metal layer 68 of the electrode 40 to heat the sheet 36 and the electrochromic medium 33, and with the switches 162 and 163 in the open position and the switch 168 in the closed position, current moves through the activating layers 62 of the electrodes 38 and 40 to change the visible light transmittance of the electrochromic medium 33. The invention contemplates various combinations of the above.

Figure 7B:
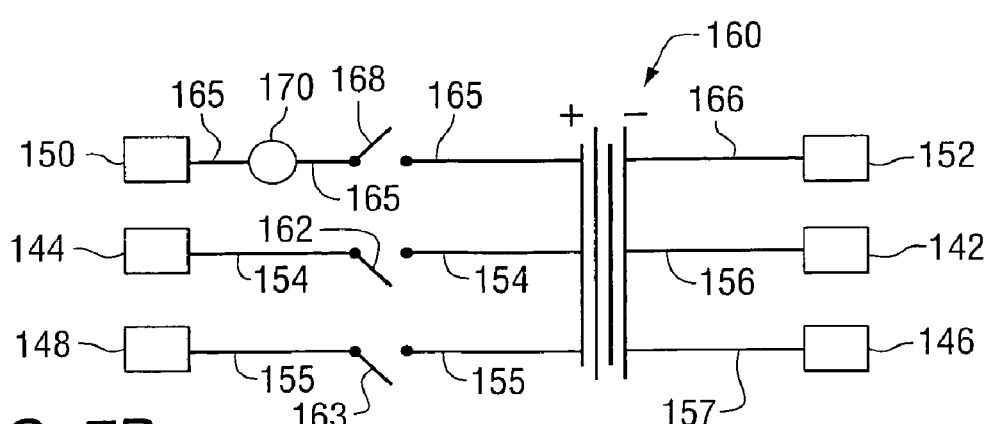

With reference to FIGS. 7 and 7B, there is shown another nonlimiting embodiment of the invention having the bus bars 142, 146 and 152 connected to the negative terminal of the power supply 160 by the wires 156, 157 and 166, respectively, and the bus bars 144, 148 and 150 connected to the positive terminal of the power supply by the wires 154, 155 and 165, respectively. The switches 162, 163 and 168 are provided between the bus bars 144, 148 and 150, respectively, and the positive terminal of the power supply 160. A variable voltage output arrangement 170 of the type used in the art to step down the voltage is provided between the bus bar 150 and the positive terminal of the power supply 160 to optionally lower the voltage between the bus bars 150 and 152 to prevent damage to the medium 33.

As can be appreciated, the invention is not limited to any particular electrical circuit design to power the electrically conductive layers of the electrodes and any of the circuits known in the art to pass current through electrodes of an electrochromic transparency or cell can be used in the practice of the invention.

As can be appreciated by those skilled in the art, the base layer 60 and/or the activating layer 62 of each electrodes 38 and 40 can have similar layers and/or films or different layers and/or films. For example in one nonlimiting embodiment of the invention, the outer surface 44 of one sheets of one of the electrode assemblies, e.g. the sheet 35, faces the interior of a vehicle (not shown) and the electrode has the base layer 60 having the high electrical resistance layer 90B and the activating layer 62, and the outer surface 44 of the sheet of the other one of the electrode assemblies, e.g. the sheet 36, faces the exterior of the vehicle and the electrode has the base layer 60 having an electrically conductive connecting layer 90A, e.g. an indium tin oxide film. In this manner, the electrode assembly facing the interior of the vehicle has the metal layer 68 acting as a heating layer, and the electrode assembly facing the exterior of the vehicle has the metal layer 68 that promotes passage of current from the metal layer 68 to the overlaying metal layer 78 of the activating layer 62, as was discussed above. In another nonlimiting embodiment of the invention, the electrodes 38 and/or 40 can include only the base layer 60 having an electrically conductive connecting layer 90A. For example and not limiting to the invention, the electrode assembly would include but not be limited to a sheet/a first dielectric layer 66 (e.g. a zinc stannate film and a zinc oxide film)/a metal layer 68 (e.g. a silver film)/a protective layer 88/an electrically conductive connecting layer 90A (e.g. an indium tin oxide film). Further, the layers 60 and 62 of the electrodes 38 and 40 can be constructed from the same or different materials. Further, the thickness of the electrodes can be the same, or different from one another.

In the embodiment of the invention that includes an electrode having two metal layers, one for providing heat and the other for operating the electrochromic cell, in establishing the thickness of the layer between the metal layers, consideration should be given to the electrical potential established between the two metal layers. More specifically, it is believed that a dielectric layer between the metal layers can break down, resulting in a loss of insulating properties between the metal layers, if the electrical potential between the metal layers becomes too high. As a result, the amount of current in each metal layer and the electrical potential established therebetween should be taken into account when selecting the material and/or thickness of the dielectric layer between the metal layers. It should be appreciated that this relationship is of particular interest when thin films are used for the dielectric layer.

The invention is not limited to the thickness of the layers of the electrodes, and the thickness of the layers should be selected to provide an electrochromic cell having at least one transparent electrode assembly 22 and/or 24. Further, as can be appreciated the invention is not limited to the materials of the layers and films discussed above and any of the coating films known in the art can be used in the practice of the nonlimiting embodiments of the invention for the layers 66, 80 and 90, e.g. and not limited to indium tin oxide, zinc stannate, zinc oxide, tin oxide, silicon oxide, silicon nitride, silicon oxynitride and mixtures and combinations thereof.

The thickness of the layers of the base layer 60 and the activating layer 62 of the electrodes are not limiting to the invention, and are preferably selected to provide the electrochromic switchable transparency of the invention with a visible light transmission of greater than 0% and in one nonlimiting embodiment greater than 50% when the activating layers 62 of the electrodes are not energized, and to provide the surfaces of the electrodes, e.g. the surfaces 30 and 32 of the electrodes 38 and 40 (see FIGS. 1 and 2) contacting the electrochromic switchable medium 33 with a sheet resistivity of less than 20.0 ohms per square, for example and not limiting to the invention, a sheet resistivity of less than 10 ohms per square, e.g. less than 5 ohms per square or no greater than 3.5 ohms per square. In a further nonlimiting embodiment of the invention, the thickness and index of the layers of the base layer 60 and activating 62 of the electrodes are selected to provide the transparency or cell 20 with a neutral color, and/or to provide the transparency with a transmitted color, when the electrodes are not energized.

With reference to FIG. 4, regarding the base layer 60 and not limiting to the invention, when the first layer 66 is a dielectric layer, the first layer has a thickness in the range of 100-800 angstroms, e.g. in the range of 200-400 angstroms or in the range of 250-350 angstroms. When the support layer 74 of the first layer 66 is a zinc stannate film and the metal contact film 72 is a zinc oxide film, the zinc stannate film has a thickness in the range of 50-320 angstroms, e.g. in the range of 120-320 angstroms or in the range of 150-250 angstroms, and the zinc oxide film has a thickness in the range of 50-300 angstroms, e.g. in the range of 80-200 angstroms or in the range of 100-200 angstroms. The first metal layer 68 has a thickness in the range of 80-300 angstroms, e.g. in the range of 120-250 angstroms or in the range of 130-250 angstroms. When the first metal layer 68 is a silver film, the silver film has a thickness in the range of 80-300 angstroms, e.g. in the range of 90-200 angstroms or in the range of 90-150 angstroms. When the connecting layer 90 is a high electrically resistance connecting layer 90B, the layer has a thickness in the range of 150-1000 angstroms, e.g. in the range of 400-800 angstroms or in the range of 450-700 angstroms. When the connecting layer 90B includes a zinc stannate dielectric film and a zinc oxide film, the zinc stannate dielectric film has a thickness in the range of 200-700 angstroms, e.g. in the range of 220-500 angstroms or in the range of 250-350 angstroms, and the zinc oxide film has a thickness in the range of 50-300 angstroms, e.g. in the range of 80-200 angstroms or in the range of 100-200 angstroms. When the connecting layer 90 is an electrically conductive connecting layer 90A, the layer has a range of 50-750 angstroms, e.g. in the range of 80-600 angstroms or in the range of 100-400 angstroms. When the connecting layer 90A is an indium tin oxide film, the film has a thickness in the range of 50-600 angstroms, e.g. in the range of 100-500 angstroms or in the range of 250-400 angstroms.

Regarding the activating layer 62 and not limiting to the invention, the second metal layer 78 can have a thickness in the range of 80-300 angstroms, e.g. in the range of 120-250 angstroms or in the range of 130-250 angstroms. When the metal layer 68 is a silver film, the silver film can have a thickness in the range of 80-300 angstroms, e.g. in the range of 120-250 angstroms or in the range of 130-250 angstroms. The conductive metal oxide layer 80 can have a thickness in the range of 50-750 angstroms, e.g. in the range of 80-600 angstroms or in the range of 100-400 angstroms. When the conductive layer 80 is an indium tin oxide film, the film can have a thickness in the range of 50-600 angstroms, e.g. in the range of 100-500 angstroms or in the range of 250-400 angstroms.

The optimal thickness of the protective layers 82 and 88 of the activating layer 62 and the base layer 60, respectively, varies depending upon whether the electrode assemblies 22 and 24 of the present invention will be exposed to heat treatment during the production of the electrode assemblies. Because the basic function of the protective layers 82 and 88 is to protect the metal layers, e.g. the silver films 78 and 68, respectively, from oxidizing during the deposition of the conductive layer 80 and the contacting layer 90, respectively, on their respective metal layer, the protective layers can be thin where the electrode assemblies of the present invention will not receive heat treatment during fabrication of the electrode assemblies. "Thin" as used herein refers to each of the protective films each having a thickness on the order of 8 to 12 angstroms. Because heat treatment is typically strongly oxidizing, the thickness of the protective layers is increased, e.g. and not limiting to the invention, to a thickness of 20 angstroms to protect the underlying metal layers during heating of the electrode assemblies.

Although not limiting to the invention, the electrodes 38 and 40 each have a thickness in the ranges of 500-3000 angstroms, e.g. in the range of 950-3000 angstroms or in the range of 950-2000 angstroms. Further, in one nonlimiting embodiment of the invention, the total thickness of the electrodes is chosen to provide a suitable antireflection effect for the final appearance, e.g. color, e.g. as discloses in U.S. Pat. Nos. 4,610,771; 5,821,001; 6,833,194, and 6,899,953 of the product, e.g. a transparent electrochromic cell and/or electrode assemblies. The disclosures of the patents are hereby incorporated by reference. Since the selection of thickness and index of sputtered deposited dielectric metal oxides, conductive metal oxides and/or metal layers to obtain a desired color and, percent transmission are well known in the art, no further discussion is deemed necessary.

As discussed above, a silver film reflects infrared energy (hereinafter also referred to as "IR") away from the chamber 34 to prevent IR degradation of the switchable medium 33. In other nonlimiting embodiments of the invention, the sheets can be provided with cerium oxide and/or titanium oxide as discussed in U.S. Pat. Nos. 5,240,886 and 5,593,929, which patents are hereby incorporated by reference, to absorb ultraviolet energy, e.g. in the wavelength range of less than 400 angstroms of the electromagnetic spectrum (hereinafter also referred to as "UV") to prevent UV degradation of the switching medium 33. In another nonlimiting embodiment of the invention, glass compositions can include additives to absorb the IR, and the sheets can be coated to reflect UV radiation as is known in the art.

The electrochromic transparencies or cells 20 (FIG. 1 and 2), 100 (FIG. 5) and/or 140 (FIG. 7) can have any size and shape, and the size and shape can be selected according to the particularly desired use of the transparency 20. For example, and not limiting to the invention, the electrochromic transparency 20 can have a symmetrical geometry; more particularly, the transparency 20 can have a square or rectangular shape. Such symmetrical shaped transparencies are particularly useful as an architectural glazing, such as but not limited to windows or window assemblies. Further the invention contemplates the cell 20 having a non-symmetrical geometry; more particularly, the sheets 35 and 36 of the transparency can have non-linear sides and/or the sheets 35 and 36 can have curved outer surfaces 44, and/or curved inner surfaces 42. Such non-symmetrical shaped transparencies are particularly useful when used for, but not limited to, vehicular transparencies, e.g. but not limited to windshields, side windows, rear windows and roof windows.

In the non-limiting embodiment of the invention described above, the visible light transmittance of the electrochromic medium 33 in the chamber 34 is reduced upon application of an electrical potential to the electrodes, e.g. the electrodes 38 and 40 shown in FIG. 7 by way of the bus bars 150 and 152, and the sheets 35 and 36 are heated upon application of an electrical potential the electrodes by way of the bus bars 142 and 144, and 146 and 148, as discussed above. The invention, however, is not limited to the design of the bus bar, and any bus bar design and arrangement can be used in the practice of the invention to connect the bus bars to the metal layers of the electrodes. For example and not limiting to the invention, the bus bars and the arrangement of bus bars disclosed in U.S. Pat. Nos. 6,064,509 and 6,471,360 and in U.S. application Ser. No. 11/472,330 entitled "An Electrochromic Vision Panel Having a Plurality of Connectors," now U.S. Pat. No. 7,173,750 filed concurrently herewith, can be used in the practice of the invention. Further and not limiting to the invention, the bus bars can be conductive ceramic paste of the type used in the automotive art that are fired on the inner surface 42 of the sheets 35 and 36 and the electrodes can be coated over the ceramic bus bars. Still further, as can be appreciated the size and shape of bus bars is not limiting to the invention and can be tailored to the particular geometry of the electrochromic transparency.

The voltage level applied to the switchable medium 33 is not limiting to the invention; however, as can be appreciated by those skilled in the art, applying too high a voltage can damage the medium 33. More particularly, it is recognized that voltages above 10 volts causes electrolysis of any water and/or moisture present in the switching medium 33, which can permanently damage the switching medium, and the medium 33 will no longer switch. Although not limiting to the invention, generally voltages no greater than 5, e.g. no greater than 2 volts, or no greater than 1.5 volts, or no greater than 1.2 volts, are applied across the medium 33. As can be appreciated, in those instances where the medium 33 is free of water and moisture, voltages at the higher levels can be used.

The electrochromic switchable medium 33 between and in electrical contact with the electrodes is not limiting to the invention, and any type of medium known in the art can be used in the practice of the invention, for example, electrochromic solutions, electrochromic gels, electrochromic semisolid and solid materials, and the like can be used in the practice of the invention. The electrochromic switchable medium 33 can be a solution-phase type electrochromic medium, in which a material contained in solution in an ionically conducting electrolyte remains in solution in the electrolyte when electrochemically reduced or oxidized (including a gel). The electrochromic medium 33 can alternatively be a surface-confined electrochromic medium, in which a material which is attached directly to an electronically conducting electrode or confined in close proximity thereto remains attached or confined when electrochemically reduced or oxidized. Alternatively, electrochromic medium 33 can be an electrodeposition-type electrochromic medium, in which a material contained in solution in the ionically conducting electrolyte forms a layer on the electronically conducting electrode when electrochemically reduced or oxidized.

Although not limiting to the invention, in one nonlimiting embodiment the electrochromic medium 33 comprises at least two compounds, including at least one anodic electrochromic compound and at least one cathodic electrochromic compound, with the anodic compound representing an oxidizable material and the cathodic compound representing a reducible material. Upon application of electrical potential to the electrochromic medium 33, the anodic electrochromic compound oxidizes and the cathodic electrochromic compound simultaneously reduces. Such simultaneous oxidation and reduction results in a change in the absorption coefficient at least one wavelength in the visible spectrum when electrochemically activated. The combination of such anodic and cathodic electrochromic compounds in the electrochromic medium 33 defines the color associated therewith upon application of electrical potential across the electrodes 38 and 40. Such cathodic electrochromic compounds are commonly referred to as viologen dyes, and such anodic electrochromic compounds are commonly referred to as phenazine dyes.

The electrochromic medium 33 can also include other materials such as solvents, light absorbers, light stabilizers, thermal stabilizers, antioxidants, thickeners, viscosity modifiers and similar materials. Further, the electrochromic medium 33 can include a dye, which defines a color. Such materials are well known in the art to color and/or to successively darken colors or shades as larger voltages are applied. In one nonlimiting embodiment of the invention, when voltage is applied to the electrodes of the invention, the medium 33 colors reducing the percent of visible light transmitted through the electrochromic medium 33, and when the voltage is turned off, the coloring of the medium 33 is bleached, increasing the percent of visible light transmitted through the medium.

In another nonlimiting embodiment of the invention, the electrochromic switchable medium 33 is capable of variable transmittance upon application of an electrical potential thereto. Application of the electrical potential can be selective, such that the electrochromic medium 33 can be selectively activated to vary the color of the medium to vary the transmittance of the electrochromic medium. In this manner, the medium 33 can be switchable between one level of transmittance when no electrical potential is applied, and between second levels of transmittance, when electrical potential is applied. Such coloring of the medium between the applied and non-applied electrical states is preferably self-erasable, such that it is switchable between an electrochemically activated state where the electrochromic medium colors upon application of the electrical potential, and an electrochemically non-activated state where the electrochromic medium automatically returns or erases to its colorless state when the electrical potential is removed. In one nonlimiting embodiment of the invention, this feature is most easily accomplished by providing the switch 168 (see FIG. 7A) or the variable output arrangement 170 (see FIG. 7B).

In a further nonlimiting embodiment of the invention, the color of the switchable medium 33 can be a constant darkness or shade upon application of an electrical potential, or can be of varying degrees of darkness or shading upon varying of the electrical potential. For example, specific coloring or shading of the coloring can be varied over a range of voltages and power densities. Upon application of a low power density to the medium 33, the medium 33 can begin to color. Increasing the voltage can cause the color of the dye to darken to a deeper shade or intensity. In this manner, the medium 33 can include varying degrees of light transmittance upon varying of the electrical potential, and can, therefore, be adjusted to a desired level of darkness or shading based upon the amount of electrical potential applied thereto. This can be accomplished by using a variable transformer for the switch between the bus bar and the power supply, e.g. but not limiting to the invention for the switch 168 (see FIG. 7A) or the variable voltage output arrangement 170 (see FIG. 7B). In one nonlimiting embodiment of the invention, the electrochromic medium 33 is switchable between a visible light transmittance range of 1% to 80%. As such, the electrochromic transparency of the invention can effectively function as an opaque shade for a window.

In still another nonlimiting embodiment of the invention, the medium of the electrochromic transparencies or cells of the invention are switchable and non-self-erasing, such that application of the electrical potential causes the electrochromic medium 33 to color, and the electrochromic medium will remain in the colored state until the electrical potential is reversed or shorted.

Electrochromic switchable mediums are well known in the art, e.g. and not limiting to the invention see U.S. Pat. Nos. 5,202,787; 5,805,330; 6,747,779; 6,828,062, and 6,667,825 for additional discussions of electrochromic mediums that can be used with the electrodes of the instant invention.

In one nonlimiting embodiment of the invention, an electrochromic switchable cell or transparency of the invention can be made in the following manner. The electrode 38 is sputtered on the inner surface 42 of the glass sheet 35, and the electrode 40 is sputtered on the inner surface 42 of the sheet 36, practicing the MSVD process. Each of the sheets 35 and 36 are 4-inch square (10.16 cm square) glass sheets, and each one of the electrodes includes a first zinc stannate dielectric film 74 having 52% zinc and 48% tin by weight and a thickness of 336 angstroms deposited on the inner surface 42 of the glass sheets 35 and 36; a first zinc oxide film 72 having a thickness of 85 angstroms deposited on the first zinc stannate film 74; a first silver film 68 having a thickness of 220 angstroms deposited on the first zinc oxide film 72; a first copper protective film 88 having a thickness of 8 angstroms deposited on the silver film 68. For the electrically conductive layer 94A an indium tin oxide film having a thickness of 700 angstroms is deposited on the first copper protective film 88, and for the high electric resistance layer 94B a second film 74 having 52% zinc and 48% tin by weight and a thickness of 700 angstroms is deposited on the first copper protective film 88. A second zinc oxide film 72 having a thickness of 85 angstroms is deposited on the layer 94A or 94B; a second silver film 68 having a thickness of 220 angstroms is deposited on the second zinc oxide film 72; a second copper protective film 82 having a thickness of 10 angstroms is deposited on the second silver film 78, and an indium tin oxide film 80 having a thickness of 373 angstroms is deposited on the second copper protective film 82. The glass sheets having the sputtered electrodes are each expected to have a visible transmittance of greater than 55%, and the surface of the indium tin oxide to contact the medium 33 is expected to have a sheet resistivity of 2.4 ohms per square.

A preformed polymeric spacing element 29 having an adhesive layer on the top and bottom surfaces of the spacer element 29 is placed on the inner surface 30 of the electrode assembly 22. The inner surface 32 of the electrode assembly 24 is placed over the adhesive layer on the other side of the spacer element, and the electrode assemblies 22 and 24 pressed toward one another and the adhesive layer cured to provide the sealed chamber 34.

A solution-phase type electrochromic medium 33 of the type used in the art having a visible light transmission of greater than 70% is poured through the hole 46 in the spacer element 29 to fill the chamber 34. After the chamber 34 is filled, the hole is sealed with an adhesive. Thereafter the bus bars 142, 144, 146, 148 150 and 152 are connected to the electrodes 38 and 40 as shown in FIG. 7 for the transparency having the high electrical resistance layer 94B, and the bus bars 114 and 116 are connected to the electrodes 38 and 40 as shown in FIG. 5 for the transparency having the conductive layer 94A. The bus bars are connected to the power supply as previously discussed.

In one nonlimiting embodiment of the invention, when the bus bars of the transparency are not powered and current is not moved through the medium, as previously discussed, the vision area of the electrochromic transparency is expected to have a visible light transmission in the range of 60-75%. As such, the electrochromic transparency is in the lightened state. When the bus bars of the transparency are powered and current moves through the medium, the transparency is darkened and the vision area of the transparency is expected to have a visible light transmission of about 0-1%. Disconnecting power to the electrodes causes the electrochromic medium 33 to begin to self-erase, thereby returning the transparency to its original lightened state.

When electrical power is applied to the bus bars 142 and 144 of the transparency having layer 94B, the sheet 35 is heated, and when the electrical power is applied to the bus bars 146 and 148, the sheet 36 is heated (see FIGS. 7 and 7A) as previously discussed.

Figure 8:
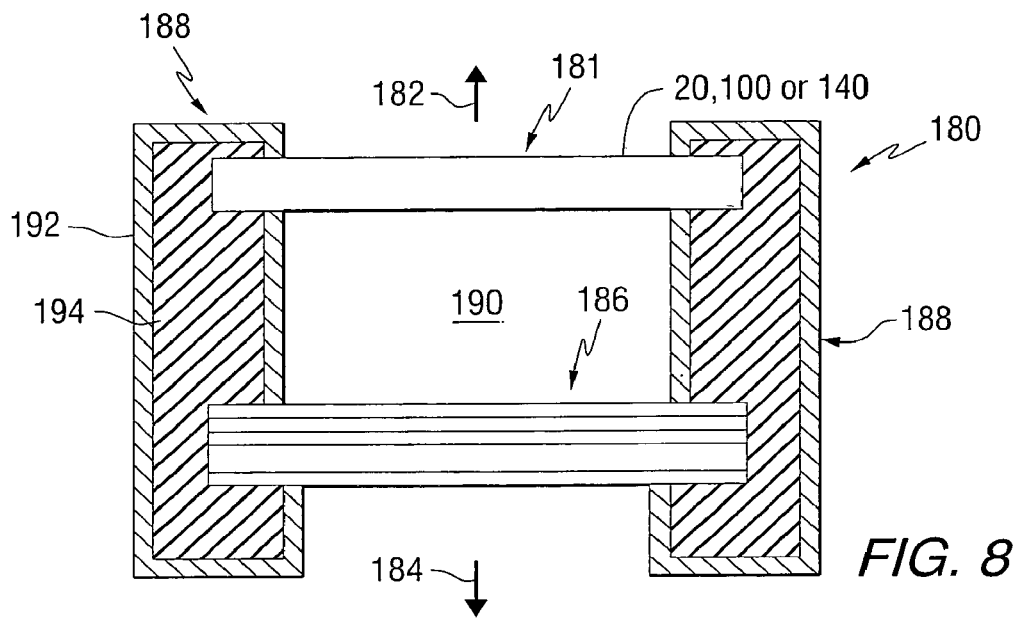
FIG. 8 is a cross-sectional side view of an aircraft transparency having the electrochromic switchable transparency of the invention.

Shown in FIG. 8 is a nonlimiting embodiment of an aircraft transparency 180 having an electrochromic switchable transparency of the invention, e.g. the transparency 20, 100 or 140. The outboard direction of the aircraft relative to aircraft transparency 180 is shown by the arrow 182 and the inboard direction of the aircraft relative to aircraft transparency 180 is shown by the arrow 184. Outboard pane assembly 181 of the aircraft transparency 180, which includes the electrochromic switchable transparency of the invention, is held in spaced-apart substantially parallel facing relationship with an optional vibration dampening/sound absorbing pane assembly 186 by a spacer frame assembly 188 forming airspace 190 therebetween. The spacer frame assembly 188 includes an aluminum frame 192, which surrounds a rubber layer 194 holding the outboard-pane assembly 181 in spaced relationship to vibration dampening/sound absorbing pane assembly 186. Where the airspace 190 is sealed, the airspace can be fully or partially filled with an insulating gas such as air, argon, krypton or mixtures thereof. A protective inner ply (not shown in FIG. 8) is typically provided on the inboard side of space frame assembly 188 to prevent physical contact with the pane assembly 186. For a detailed discussion of the spacer frame assembly 188 and the vibration dampening/sound absorbing pane assembly 186 reference can be made to U.S. Pat. No. 5,965,853, which patent is hereby incorporated by reference. The outboard pane assembly 181 includes the electrochromic switchable transparency of the invention and additional plastic and glass sheets arranged to provide an outboard pane assembly meeting all the safety requirements of aircraft transparencies. For example and not limiting to the invention, the outboard pane assembly 181 includes the electrochromic transparency of the invention and optionally can include two or more panes of glass or plastic, which can additionally include one or more interlayers disposed between the panes, or the laminate can include the combination of a single pane and one or more interlayer materials laminated thereon to form the outboard pane assembly 181. The glass panes can be chemically or thermally tempered. Suitable plastic panes include cast acrylics, stretched acrylics, and polycarbonates. Suitable interlayer materials include polyvinyl butyral, urethanes, silicones and combinations thereof. As an alternative, the electrochromic element can be independent from the outboard pane assembly 181. More specifically, assembly 181 can comprise one or more plastic and/or glass plies and an electrochromic transparency of the type discussed herein can be positioned within airspace 190, spaced from assembly 181. As should be appreciated by those skilled in the art, the electrochromic switchable transparency of the present invention can also be incorporated into the vibration dampening/sound absorbing pane assembly 186 or it can be independent of both the outer pane assembly 181 and the vibration dampening/sound absorbing pane assembly 186 of aircraft transparency 180.

As can now be appreciated, the invention is not limited to the article in which the electrodes of the invention can be used. More particularly, with reference to FIG. 9, there is shown another nonlimiting embodiment of the invention using the electrodes of the invention for a mirror 210, e.g. and not limiting to the invention, an inside rear view mirror, or an outdoor rear view mirror, of a vehicle, or a bathroom mirror. The mirror 210 includes the sheet 35 and the electrode assembly 24, with the sheet 35 having a reflective coating 212 on the inner surface 42 of the sheet 35, and an electrode 220 over the reflective layer 212. In one nonlimiting embodiment of the invention, the electrode 220 includes the activating layer 62 on the dielectric layer 66 of the base layer 60, and the bus bar 150 connected to the activating layer 62.

As can be appreciated, since the sheet 35 has the reflective coating 212 on the inner surface 42, the sheet 35 can be transparent or opaque and made of any material, e.g. and not limiting to the invention, wood, glass, metal, plastic or combinations thereof. Optionally, the reflective coating 212 can be provided on the outer surface 44 of the sheet 35. In this case the sheet would be transparent, e.g. have a visible light transmission greater than 60%. Depositing reflective coatings on substrates to provide a reflective or mirror surface is well known in the art, and no further discussion regarding the reflective coating 212 is deemed necessary.

As can be appreciated, the invention contemplates having the electrode 38 used in place of the electrode 220. In this instance the electrode 38 includes the connecting layer 90A having the electrically conductive layer 94A (shown in FIG. 4) and the bus bar 114 (initially shown in FIG. 5B) electrically connected to the activating layer 62 and the first metal layer 68 of the base layer 60 (see also FIG. 4).

The electrode assembly 24 includes the glass sheet 36 having the electrode 40 on the inner surface 42 of the transparent sheet 36. The electrode 40 of the electrode assembly 24 includes the connection layer 90B having the high electrical resistance layer 94B (shown in FIG. 4) and includes the bus bar 152 connected to the activation layer 62 of the electrode 40, and the bus bars 146 and 148 connected to the first metal layer 68 as shown in FIG. 7 and as discussed above. The bus bars 146 and 148 are connected to the power supply 160, and the bus bars 150 and 152 are connected to the power supply 164, as shown in FIG. 7A.

Figure 9:
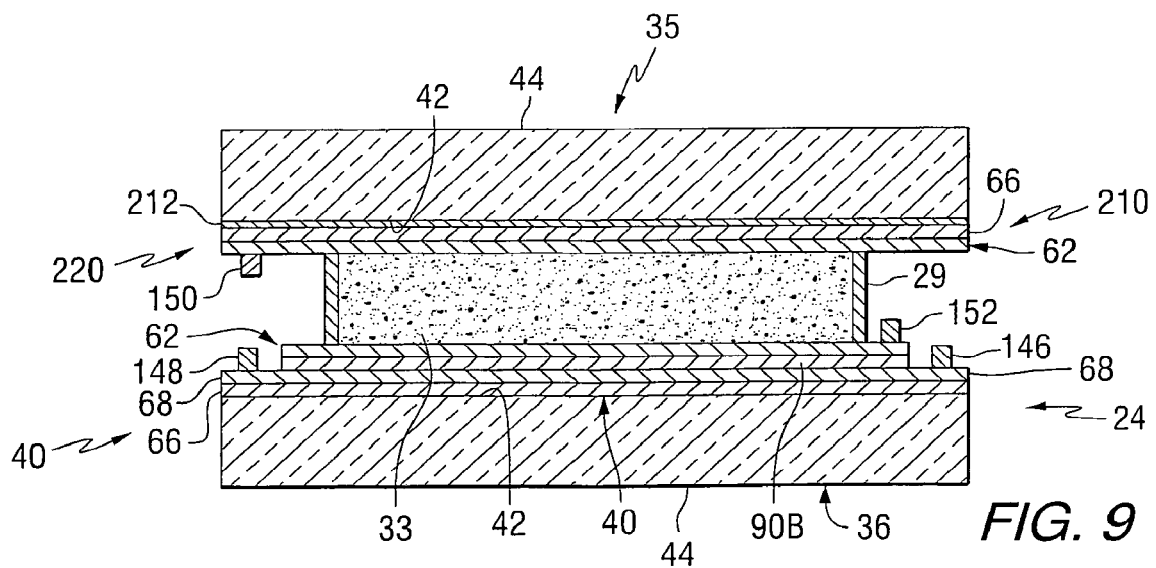
FIG. 9 is cross-sectional side view of an electrochromic switchable mirror having the electrodes of the invention.

With reference to FIGS. 7A and 9, in one nonlimiting embodiment of the invention to reduce glare from the lights of a following vehicle, the switch 168 is closed and current to the bus bars 152 and 150 is varied by a variable voltage output arrangement, e.g. the variable voltage output arrangement 170 shown in FIG. 7B to reduce the visible light transmission of the medium 33. Moisture e.g. snow, fog, condensation and/or ice accumulated on the outer surface 44 of the sheet 36 of the mirror 210 is removed by closing the switch 163 to move current through the metal layer 68 to heat the medium 33 and the sheet 36 as discussed above.

An electrode 220 was made using an ILS laboratory MSVD coater. The electrode was deposited on a glass sheet and included a zinc stannate dielectric film 74 having 52% zinc and 48% tin by weight and a thickness of 336 angstroms, deposited on the inner surface 42 of the glass sheet; a zinc oxide film 72 having a thickness of 85 angstroms deposited on the zinc stannate film 74; a silver film 78 having a thickness of 220 angstroms deposited on the zinc oxide film 72; a copper protective film 82 having a thickness of 8 angstroms deposited on the silver film 78; an indium tin oxide film 80 having a thickness of 373 angstroms deposited on the protective film 82. The indium tin oxide layer was produced using an indium tin oxide ceramic target sputtered in atmosphere of 5% oxygen, 95% argon. The surface of the indium tin oxide layer of the electrode 220 had a sheet resistivity in the range of 2.4 to 3.4 ohms per square. The electrode assembly made in the above manner did not have the reflective layer 212, and the electrode on a clear glass sheet had a visible transmittance of greater than 55%.

The electrode assembly did not include the reflective film 212, however, electrode assemblies including the electrode 220 on a glass piece were made. The electrode assemblies made were used to make workable electrochromic switchable transparencies.

Nonlimiting embodiments of the electrode 220, include: the first layer 66 on the reflective layer 212 or the inner surface 42 of the sheet 35, the metal layer 78 on the first layer, the protective layer 82 on the metal layer 78 and the conductive metal oxide layer 80 on the protective layer. As can be appreciated, the electrode 220 of the mirror 210 can be replaced with the electrode 38 on the reflective layer 212. In this instance the bus bar 114 (see FIG. 5B) is used and the bus bar 110 (see FIG. 5) is omitted.

Further, as can now be appreciated, the invention is not limited to the number of metal layers, e.g. the metal layers 68 and 78, that the electrodes have, and the electrodes of the invention can include the activating layer 62 (see FIG. 4) having two or more metal layers 78 used with the electrically conductive metal oxide layer 80 to increase the rate of current flow through the medium 33, and/or the base layer 60 having two or more metal layers 68 to increase the current across the base layer 60 to increase the heating temperature of the base layer 60.

Based on the description of the embodiments of the invention, it can be appreciated that this invention is not limited to the particular embodiments disclosed, but it is intended to cover modifications that are within the spirit and scope of the invention, as defined by the appended claims.

What is claimed is:

1. An article comprising;
a first electrode assembly having an electrode defined as a first electrode;
a second electrode assembly having an electrode defined as a second electrode with the first and second electrodes in facing relationship to one another;
a medium between the first and second electrodes, the medium in response to electric stimuli alters percent of visible light transmitted through the medium;
the first electrode assembly having a first major surface facing the medium with the first electrode between the first major surface and the medium, the first electrode comprising:
a first electrically conductive layer between the medium and the first major surface;
a second electrically conductive layer spaced from the first electrically conductive layer and between the first electrically conductive layer and the medium;
first and second electrical contact members spaced from one another and contacting the first electrically conductive layer, wherein the first and second electrical contact members and the first electrically conductive layer provide a first electrically conductive path, and
a third electrical contact member contacting the second electrically conductive layer, and
a fourth electrical contact member contacting the second electrode, wherein the third and fourth electrical contact members, the second electrically conductive layer, the medium and the second electrode provide a second electrically conductive path.

2. The article according to claim 1, wherein the medium is an electrochromic switchable medium and at least one of the electrode assemblies is transparent to wavelengths in the range of 400-700 nanometers.

3. The article according to claim 1, wherein electrical current moving through the first electrically conductive layer heats the first major surface of the first electrode assembly.

4. The article according to claim 1, wherein the first and third electrical contact members are both connected to a positive or negative terminal of a direct current power supply, and the second and fourth electrical contacts are both connected to the negative or positive terminals of the power supply, respectively.

5. The article according to claim 1, wherein the first and second electrical contact members are connected to a first direct current power supply, and the third and fourth electrical contact members are connected to a second direct current power supply.

6. The article according to claim 1, wherein the second electrode assembly has a major surface defined as a second major surface facing the medium with the second electrode between the second major surface and the medium, the second electrode comprising:
an electrically conductive layer defined as a third electrically conductive layer between the medium and the second major surface;
an electrically conductive layer defined as a fourth electrically conductive layer spaced from the third electrically conductive layer and between the third electrically conductive layer and the medium;
the fourth electrical contact contacting the fourth electrically conductive layer; and
fifth and sixth electrical contact members spaced from one another and contacting the third electrically conductive layer wherein the fifth and sixth electrical contact members and the third electrically conductive layer provide a third electrically conductive path.

7. The article according to claim 6, wherein the medium is an electroconductive switchable medium, the first and second electrical contact members comprise first and second bus bars connected to the first electrically conductive layer, the third electrical contact member comprises a third bus bar connected to the second electrically conductive layer, the fourth electrical contact member comprises a fourth bus bar connected to the fourth electrically conductive layer, and the fifth and sixth electrical contact members comprises fifth and sixth bus bar connected to the third electrically conductive layer.

8. The article according to claim 1, wherein the medium is an electrochromic switchable medium and the first electrode assembly passes wavelengths in the range of 400-700 nanometers.

9. The article according to claim 8, further comprising a high electrical resistance connecting layer between and connecting the first and second electrically conductive layers, wherein the connecting layer has a predetermined resistance to electric current flowing along the first electrically conductive layer such that less than 50% of the current moving along the first electrically conductive layer passes through the connecting layer to the second electrically conductive layer.

10. The article according to claim 9, wherein the high electrical resistance connecting layer is an electrically insulating layer.

11. The article according to claim 9, wherein the first electrical contact member and the third electrical contact member is a bus bar that simultaneously provides a current connection for the first and second electrically conductive layers.

12. The article according to claim 9, wherein the first electrical contact member is a first bus bar, the second electrical contact member is a second bus bar, and the third electrical contact member is a third bus bar.

13. The article according to claim 8, further comprising an electrically conductive connecting layer between and connecting the first and second electrically conductive layers, wherein the connecting layer has a predetermined resistance to electric current flowing along the first electrically conductive layer such that at least 50% of the current moving along the first electrically conductive layer passes through the connecting layer to the second electrically conductive layer.

14. The article according to claim 13, wherein the first electrical contact member and the third electrical contact member is a bus bar that simultaneously provides a current connection for the first and second electrically conductive layers.

15. The article according to claim 13, wherein the first electrical contact member comprises a first bus bar, the second electrical contact member comprises a second bus bar, and the third electrical contact member comprises a third bus bar.

16. The article according to claim 1, wherein the medium is an electrochromic switchable medium; the first electrode assembly passes wavelengths in the range of 400-700 nanometers; the first major surface is a first major surface of a transparent substrate; the first electrically conductive layer comprises a first metal layer; and the second electrically conductive layer comprises a first electrically conductive metal film and a second electrically conductive film in electrical contact with the medium, and further comprising:

a substrate contact layer between the first metal layer and the first major surface of the substrate, and a connecting layer selected from an electrically conductive connecting layer and a high electrical resistance connecting layer, between the first metal layer of the first electrically conductive layer and the first metal film of the second electrically conductive layer.

17. The article according to claim 16, wherein the substrate is a glass sheet further comprising an opposite second major surface, and further comprising a coating selected from a hydrophobic coating, a hydrophilic coating, a solar control coating and combinations thereof, on at least one of the major surfaces of the glass sheet.

18. The article according to claim 16, wherein a closed frame is between and joined to the electrode assemblies to provide a sealed chamber between the electrode assemblies and the medium comprises an electrochromic switchable medium.

19. The article according to claim 16, wherein the article is selected from:
(A) a transparency for a vehicle selected from the group of
   (a) land vehicles selected from the group of automobiles, trucks, cars, motorcycles, trains and combinations thereof; (b) aircraft vehicles; (c) space vehicles; (d) above water vehicles; (e) below water vehicles, and (f) combinations thereof;
(B) windows for structures selected from the group of (a) residential homes; (b) commercial buildings; (c) oven doors, (d) microwave doors; (e) refrigerator doors: and (f) combinations thereof;
(C) mirrors
(D) vehicular rear view mirrors;
(E) vehicular side view mirrors, and
(F) combinations thereof.

20. The article according to claim 16, wherein the substrate contact layer comprises a support layer and a metal contact layer.

21. The article according to claim 20, wherein the support layer of the substrate contact layer comprises a zinc stannate film, the metal contact layer of the substrate contact layer comprises a zinc oxide film, and the first metal layer of the first electrically contact layer comprises a silver film defined as a first silver film.

22. The article according to claim 21, wherein the zinc stannate film is on the first major surface of the substrate, the zinc oxide film is on the zinc stannate film, and the first silver film is on the zinc oxide layer.

23. The article according to claim 22, wherein the connecting layer is a high electrical resistance connecting layer to electrically insulate the first silver film of the first electrically conductive layer from the first metal film of the second electrically conductive layer.

24. The article according to claim 23, wherein the high electrical resistance connecting layer comprises a dielectric support layer and a metal contact layer.

25. The article according to claim 24, wherein the dielectric support layer of the high electrical resistance connecting layer comprised a dielectric zinc stannate film, the metal contact layer of the high electrical resistance connecting layer comprises a zinc oxide layer, and the metal film of the second electrically conductive layer is a silver film defined as a second silver film.

26. The article according to claim 25, wherein the dielectric zinc stannate film of the high electrical resistance connecting layer is over the first silver film, the zinc oxide film of the high electrical resistance connecting layer is on the dielectric zinc stannate film of the high electrical resistance connecting layer, and the second silver film is on the zinc oxide film of the high electrical resistance connecting layer.

27. The article according to claim 22, wherein the connecting layer is an electrically conductive connecting layer to electrically interconnect the first silver film of the first electrically conductive layer and the first metal film of the second electrically conductive layer.

28. The article according to claim 27, wherein the electrically conductive connecting layer is a current conducting layer to pass at least 50% of the current applied to the first silver film of the first electrically conductive layer to the first metal film of the second electrically conductive layer.

29. The article according to claim 28, wherein the electrically conductive connecting layer comprises a support layer and a metal contact layer.

30. The article according to claim 29, wherein the support layer of the electrically conductive connecting layer is a zinc stannate film, the metal contact layer of the electrically conductive connecting layer is a zinc oxide layer, and the first metal film of the second electrically conductive layer is a silver film defined as a second silver film.

31. The article according to claim 30, wherein the second film of the second electrically conductive layer is a conductive metal oxide film, and the zinc stannate film of the electrically conductive connecting layer is over the first silver film, the zinc oxide film of the electrically conductive connecting layer is on the zinc stannate film of the electrically conductive connecting layer, the second silver film is on the zinc oxide film of the electrically conductive connecting layer, and the second film of the second electrically conductive layer is over the second silver film.

32. The article according to claim 27, wherein the electrically conductive connecting layer comprises a protective film over the first metal layer of the first electrically conducting layer and an electrically conductive ceramic film over the protective film.

33. The article according to claim 32, wherein the protective layer is an oxygen deficient sputtered ceramic film on the first metal layer and the electrically conductive ceramic film is a sputtered ceramic film having more oxygen than the oxygen deficient sputtered ceramic film on the oxygen deficient sputtered ceramic film.

34. The article according to claim 16, further comprising a protective layer on the first metal layer of the first electrically conductive layer and on the first metal film of the second electrically conductive layer.

35. The article according to claim 34, wherein the protective layer on at least one of the first metal layer of the first electrically conductive layer and the first metal film of the second electrically conductive layer is an oxygen deficient sputtered ceramic film.

36. The article according to claim 34, wherein the protective layer on at least one of the first metal layer of the first electrically conductive layer and the first metal film of the second electrically conductive layer is selected from zirconium, titanium, copper, metal oxides, metal nitrides, non-stoichiometric ceramics, titanium nitride and combinations thereof.

37. In an article having a first electrode assembly spaced from a second electrode assembly, and a medium between the first and second electrode assemblies, wherein the medium in response to an electric stimuli alters percent of visible light transmitted through the medium, the improvement comprising:

at least one of the electrode assemblies comprising:
a surface;
a first zinc stannate layer over the surface;
a first zinc oxide layer over the first zinc stannate layer, and
a first metal layer on the first zinc oxide layer.

38. The article according to claim 37, wherein the article is an electrochromic switchable cell and further comprising an electrically conductive layer over the first metal layer and in contact with the medium.

39. The article according to claim 38, further comprising a protective layer between the first metal layer and the conductive layer.

40. The article according to claim 39, wherein the protective layer is an oxygen deficient sputtered ceramic film and the conductive layer is a sputtered ceramic film having more oxygen than the oxygen deficient sputtered ceramic film.

41. The article according to claim 37, wherein the article is an electrochromic switchable cell, and further comprising:
a second zinc stannate layer the over the first metal layer;
a second zinc oxide layer over the second zinc stannate layer;
a second metal layer on the second zinc oxide layer, and
an electrically conductive layer over the second metal film.

42. The article according to claim 41, further comprising a protective layer on the first and second metal layers.

43. The article according to claim 42, wherein the protective layer is selected from zirconium, titanium, copper, metal oxides, metal nitrides, non-stoichiometric ceramics, titanium nitride and combinations thereof.

44. A method of operating an electrochromic switchable cell having a first transparent electrode assembly on a major surface, the first electrode assembly spaced from a second electrode assembly, and an electrochromic switchable medium between the first and second electrode assemblies, the method comprising:
providing the first electrode assembly with a first electrically conducting layer spaced from the major surface and in electrical contact with the electrochromic switchable medium and a second electrically conductive layer between the first electrically conductive layer and the major surface and spaced from the first electrically conducting layer and the electrochromic switchable medium, and
at selected times, moving current through the first and/or the second electrically conductive layers, wherein current moving through the second electrically conductive layer heats the major surface and current moving through the first electrically conductive layer moves through the electrochromic medium to the second electrode assembly to alter the visible light transmission of the medium.

45. The method according to claim 44, wherein the first electrically conducting layer is a first metal layer and the second electrically conducting layer is a second metal layer, and the step of providing at least one electrode assemblies comprises the steps of:
providing a first dielectric layer over the major surface;
providing the second metal layer over the first dielectric layer;
providing a bridging layer over the second metal layer;
providing the first metal layer over the bridging layer; and
providing an electrically conducting metal oxide layer over the first metal layer.

* * * * *